(12) United States Patent
Puite et al.

(10) Patent No.: US 12,404,107 B2
(45) Date of Patent: Sep. 2, 2025

(54) SYSTEM AND METHOD FOR ORDER FULFILLMENT SEQUENCING AND FACILITY MANAGEMENT

(71) Applicant: Dematic Corp., Grand Rapids, MI (US)

(72) Inventors: Philip J. Puite, Grand Rapids, MI (US); Martin Thomas, Ada, MI (US); Jack Tuinstra, Belmont, MI (US); Fredrick D. Herlacher, Grand Rapids, MI (US); Jeff Gibson, Rockford, MI (US)

(73) Assignee: Dematic Corp., Grand Rapids, MI (US)

( * ) Notice: Subject to any disclaimer, the term of this patent is extended or adjusted under 35 U.S.C. 154(b) by 1002 days.

(21) Appl. No.: 17/494,929

(22) Filed: Oct. 6, 2021

(65) Prior Publication Data

US 2022/0106121 A1  Apr. 7, 2022

Related U.S. Application Data

(60) Provisional application No. 63/088,013, filed on Oct. 6, 2020.

(51) Int. Cl.
  *G06Q 10/08* (2024.01)
  *B65G 1/137* (2006.01)
(52) U.S. Cl.
  CPC .................. *B65G 1/1375* (2013.01)
(58) Field of Classification Search
  CPC .................. B65G 1/137; G06Q 10/08
  See application file for complete search history.

(56) References Cited

U.S. PATENT DOCUMENTS

| | | | |
|---|---|---|---|
| 7,086,519 B2 | 8/2006 | Veit et al. | |
| 8,713,899 B2 * | 5/2014 | Hortig | B65B 67/02 414/280 |
| 8,974,168 B2 | 3/2015 | Yamashita | |
| 9,026,243 B2 * | 5/2015 | Radwallner | B65G 1/1378 700/214 |

(Continued)

OTHER PUBLICATIONS

International Search Report and Written Opinion of the International Searching Authority from corresponding Patent Cooperation Treaty (PCT) Application No. PCT/IB21/59173, indicated completed on Oct. 24, 2022.

*Primary Examiner* — Patrick H Mackey
(74) *Attorney, Agent, or Firm* — Gardner, Linn, Burkhart & Ondersma LLP

(57) ABSTRACT

A system and method is provided for controlling an automated warehouse or order fulfillment facility. The system includes a sequencing tower, which functions as a buffer for inbound items and shipping containers, and various pick/decant workstations which are connected between the sequencing tower and an automated storage and retrieval system (ASRS). The sequencing tower is adapted for receiving, storing, and releasing newly erected shipping containers and inbound vendor cases. The pick/decant workstations function as a hub between the sequencing tower and the ASRS, where operators at the pick/decant workstations pick order items to shipping containers to fulfil orders or pick inbound/vendor items to inventory containers to be stored in the ASRS. The system and methods synchronize the sequencing tower and ASRS to release items to arrive at the workstations simultaneously to optimize efficiency and throughput of the facility.

10 Claims, 31 Drawing Sheets

(56) References Cited

U.S. PATENT DOCUMENTS

| | | |
|---|---|---|
| 9,266,675 B2 | 2/2016 | Yamashita |
| 9,452,886 B2 | 9/2016 | Yamashita |
| 9,555,967 B2 | 1/2017 | Stevens |
| 9,580,248 B2 | 2/2017 | Hasman et al. |
| 9,604,781 B2 | 3/2017 | Stevens et al. |
| 9,630,777 B2 * | 4/2017 | Yamashita ............ B65G 1/1375 |
| 10,062,046 B2 | 8/2018 | Ogden |
| 10,301,113 B2 | 5/2019 | Stevens et al. |
| 10,322,880 B2 * | 6/2019 | Collin .................... B65G 47/50 |
| 10,329,089 B2 * | 6/2019 | Kasper ................. B65G 17/485 |
| 10,878,374 B1 | 12/2020 | Shi |
| 11,074,547 B2 * | 7/2021 | Rajkhowa ............... G06Q 10/04 |
| 11,136,192 B2 * | 10/2021 | Ahmann .................. B25J 5/007 |
| 11,492,200 B2 | 11/2022 | Khodl et al. |
| 11,673,746 B2 | 6/2023 | Parrott et al. |
| 11,858,743 B2 * | 1/2024 | Bauman ............. B65G 47/5186 |
| 11,939,162 B2 * | 3/2024 | Douglas ............... B65G 1/1375 |
| 2013/0073076 A1 | 3/2013 | Mathi et al. |
| 2017/0313514 A1 * | 11/2017 | Lert, Jr. ................ B65G 1/0478 |
| 2019/0205825 A1 | 7/2019 | Lindbo |
| 2019/0375589 A1 | 12/2019 | Gravelle et al. |
| 2020/0031576 A1 | 1/2020 | Lert, Jr. et al. |
| 2023/0133964 A1 * | 5/2023 | Gravelle ............. B65G 1/1378 700/216 |
| 2023/0271785 A1 * | 8/2023 | Gravelle ............. B65G 1/1378 |
| 2023/0359950 A1 * | 11/2023 | Fagerland ............ G06Q 10/047 |

\* cited by examiner

SYSTEM AND METHOD FOR ORDER FULFILLMENT SEQUENCING AND FACILITY MANAGEMENT

CROSS REFERENCE TO RELATED APPLICATION

The present application claims priority of U.S. provisional application Ser. No. 63/088,013 filed Oct. 6, 2020, which is hereby incorporated by reference herein in its entirety.

FIELD OF THE INVENTION

The present invention is directed to an order fulfillment system and method, and in particular to a system and method for filing customer orders received via the internet, telephone, in-store terminal or other order entry technique.

BACKGROUND OF THE INVENTION

Order fulfillment is a complex operation. Vendor trucks deliver inventory cartons that must be unloaded from the truck and decanted into donor totes, or other receptacles that are stored in an automated warehouse. A customer order is fulfilled at a goods-to-person or robot (GTP) station which receives donor totes retrieved from the warehouse having inventory items from for the order. If the donor totes are "SKU-pure" only one type of inventory item is stored in each tote or tote section so multiple donor totes often need retrieval to fill one order. At the GTP station the operator typically picks multiple orders at a time and must move between the donor totes and multiple order totes, each containing one or more orders. Each order can be a single item order that is deposited into a single tote and sent to a packing station or deposited directly into a shipping container. The order can be a multiple item order that can be shipped directly in a container which is constructed specifically for the cubic volume of the items for that order using an auto carton erector (ACE) known in the art. Some orders are shipped in envelopes or bags and others in non-bags based on customer needs.

All of the above activities occur at different rates over different times. At some times of the year, certain items are more in demand and other factors affect item demand such as sales and promotions for related goods. Also, operators operate at various rates depending on experience, whether they feel sick or other factors. This results in certain portions of the system operating at different capacities. Some may be overloaded and others "starved" for work. This inconsistency is accommodated by various buffers and other storage systems. Often systems must be oversized in order to accommodate the inefficiencies. When inventory items are out of stock, then orders cannot be completed and therefore have to be stored awaiting the missing item. Often an out-of-stock may be on a truck that is in the yard but not scheduled to be unloaded until later.

Given the ever increasing popularity of e-commerce and micro-fulfillment the number and types of items ordered in this fashion continue to expand rapidly. All of this increases the complexity of the system thus exasperating all of the above difficulties.

SUMMARY OF THE INVENTION

The present invention provides an integrated system and method for operating an order fulfillment facility, which may be in the form of an e-commerce fulfillment center, a warehouse, a micro-fulfilment center, etc. The system includes various subsystems which are substantially automated and multi-functional for carton erection, receiving, picking, decanting, consolidation, and packing. The various subsystems include, but are not limited to, receiving, decanting, picking, packing, trailer yard control, and carton erection. The method synchronizes the sequence of the various subsystems to increase productivity and throughput and to decrease downtime due to subsystem starvation and material waste. The system and method can synchronize the operation of the various subsystems and can change the operation function of versatile subsystems, such as changing a decant workstation to operate as a picking workstation, and vice versa. The system includes a sequencing tower in the form a multi-functional lift and storage system and an automated storage and retrieval system (ASRS). The sequencing tower is adapted for receiving, storing, and releasing shipping containers, inventory totes, and/or inbound containers (e.g. vendor cases). The sequencing tower functions as a hub for synchronizing various operations within the facility, the sequencing tower is in transport communication, e.g. connected via conveyors, with carton erection subsystems, receiving subsystems, pick/decant workstations, and transfer subsystems. The ASRS is in transport communication with the pick/decant workstations and the transfer subsystems. The pick/decant workstations function as a hub between the sequencing tower and the ASRS, where operators at the pick/decant workstations pick order items to shipping containers or pick totes to fulfil orders or pick inbound/vendor items to inventory containers to be stored in the ASRS.

In an exemplary picking embodiment, the system and method control and synchronize the erection and subsequent release of various sized order containers with the release of inventory items (such as from an ASRS) to meet substantially simultaneously at a goods to person workstation to maximize carton erection, operator productivity, and subsystem throughput. In an exemplary decanting embodiment, the system and method control and synchronize the release of various sized inbound containers (such as from an ASRS) with inventory containers (such as vendor cartons) to meet substantially simultaneously at a goods to person workstation to maximize operator productivity, container utilization efficiency, and subsystem throughput. A sequencing tower and automated storage and retrieval system (ASRS) enable the synchronized sequencing. The provided goods to person workstation design accommodates both the picking and decanting functions to occur at a single workstation interchangeably.

The system and method are particularly well suited for interleaving (e.g. rationing and optimizing synchronization) the flow of particular items, order types, or order configurations. For example, the system and method are capable of rationing and optimizing the flow of single line orders and multi-line orders during order fulfillment at a single workstation. The system and method are also capable of rationing and optimizing the flow of items requiring bagging (typically singular items for single line orders) to be sent to a bagging subsystem while optimizing the utilization of the bagging subsystem such that the bagging subsystem is not starved or overburdened. The system and method are also capable of rationing and optimizing the utilization of carton erectors in communication with the sequencing tower, to optimize the efficiency of each carton erector and reduce material waste associated with oversizing shipping containers.

The system and method provide many advantages over known systems, including: shorter timelines from order receipt to customer delivery; decreased facility footprint; redundant picking and decant workstations for flexibility in handling receiving/order volume imbalances; spacing of workstations to enable social distancing; mitigation of workstation starving; reduced labor requirements; efficient transfer of inventory totes among ASRS machines and automated packing; automated handling of "shorts" or under-fulfilled orders; simplification of management of the operation; supports sustainability by minimizing material waste due to shipping carton sizing discrepancies (e.g. unnecessarily oversized shipping cartons).

These and other objects, advantages, purposes and features of this invention will become apparent upon review of the following specification in conjunction with the drawings.

DESCRIPTION OF THE PREFERRED EMBODIMENTS

Figure 1:
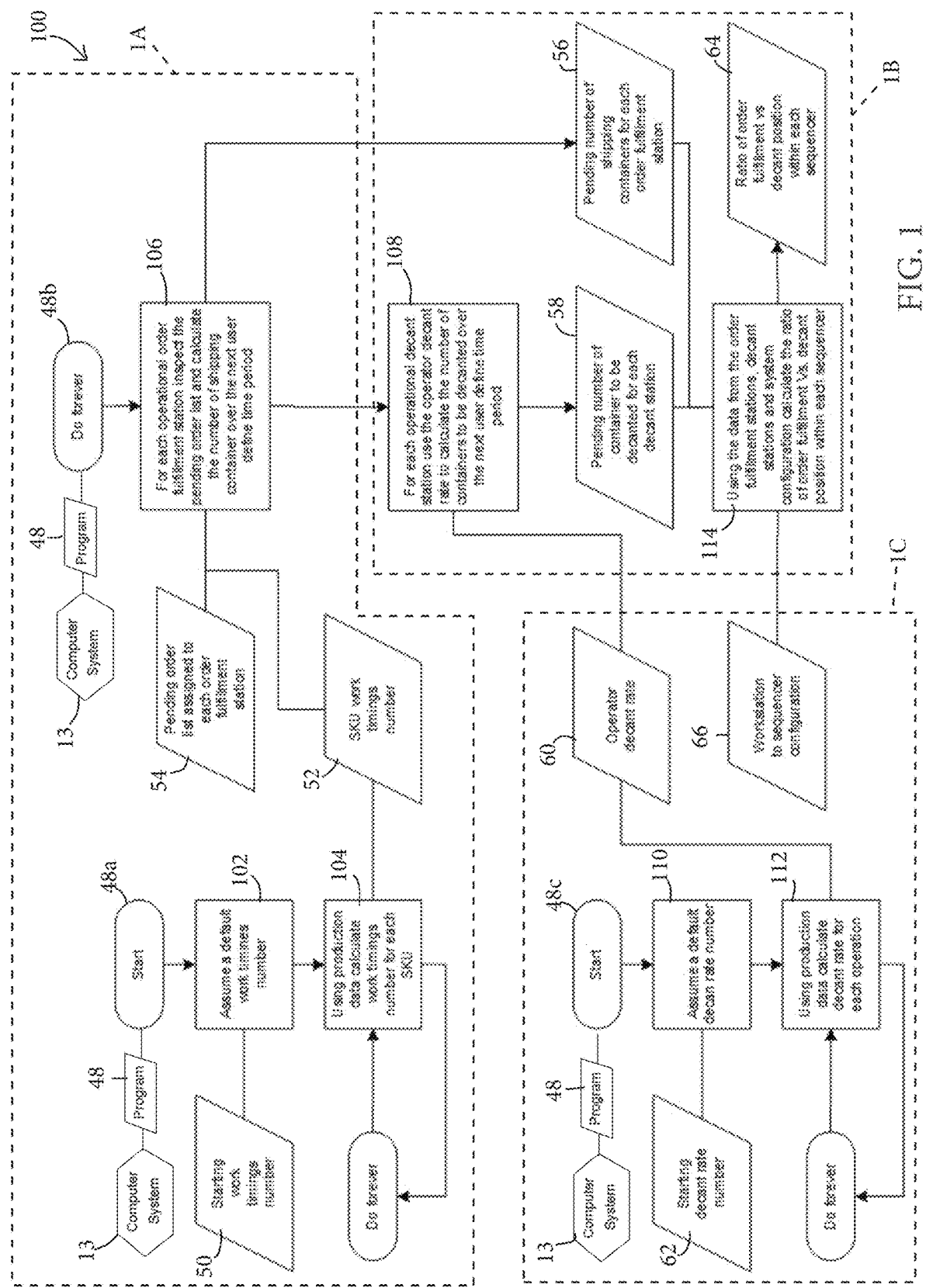
FIG. 1 is a diagram of a method for balancing and optimizing the flow of objects and containers in an automated warehouse facility, in accordance with the present invention.

Referring now to the drawings and the illustrative embodiments depicted therein, an order-fulfillment and decant sequencing system 10 and methods 100, 200, 300, 400, 500, 600, 700 are provided for sequencing and optimizing the subsystems of an order fulfilment or warehouse facility 12. The system and methods control the flow and sequencing of inbound or vendor items, stored or inventory items, storage containers, and shipping containers. The methods utilize an electronic management system, such as a computer system 13 with warehouse management software, to interconnect and synchronize an entire facility of interconnected subsystems and operation functions, including shipping/receiving yard management, internal receiving, inventory and replenishment management, order management and fulfillment, directing inbound item put-away based on order history data, internal shipping functions, rate shipping preparation and calculation, automated and mobile equipment management, and determination of best locations for item picking if multiple workstations or facility sites/buildings are installed in a network. The methods and system can be scaled to suit existing building dimensions and/or facility throughput requirements. The methods and system can be adapted for various fulfilment facilities, including warehouses, e-commerce order fulfilment facilities, micro-fulfilment facilities (e.g. grocery markets, retail), and click-and-collect facilities (online order with direct customer pickup). Multiple sequencing systems 10 may deployed within the facility, as will be further described below.

In the illustrated embodiment of FIGS. 8-12B, the order-fulfillment and decant sequencing system 10 is deployed in an order-fulfilment facility 12 and includes a sequencing tower 14 and an automatic storage and retrieval system (ASRS) 16, wherein the sequencing tower 14 functions as a hub between one or more pick/decant workstations 18 and several of the various facility subsystems. A computer system 13, such as a warehouse management system, monitors and controls the sequencing tower 14, ASRS 16, and the various subsystems to sequence and optimize the order fulfilment processes within the facility 12 (see FIGS. 1-7B). The computer system 13 has various programs, which are described in detail below, each program provided to carry out methods for sequencing and balancing order fulfillment processes to optimize the throughput of the facility 12. An exemplary ASRS may be as described in commonly assigned U.S. Pat. No. 8,974,168, issued Mar. 10, 2015, U.S. Pat. No. 9,266,675, issued Feb. 23, 2016, and/or U.S. Pat. No. 9,630,777, issued Apr. 25, 2017, which are each hereby incorporated herein by reference in their entireties. The pick/decant workstations 18 may be as described in commonly assigned U.S. patent application Ser. No. 16/829,134, filed Mar. 25, 2020, and U.S. Pat. No. 8,713,899, issued May 6, 2014, U.S. Pat. No. 9,604,781, issued Mar. 28, 2017, and/or U.S. Pat. No. 10,301,113, issued May 28, 2019, which are each hereby incorporated herein by reference in their entireties. Each pick/decant workstation 18 functions as a hub between the sequencing tower 14 and the ASRS 16. The system 10 may include various optional or auxiliary subsystems, such as receiving subsystems, shipping container or carton erector subsystems, automated packing subsystems, centralized decant subsystems, manual picking subsystems, manual packing subsystems, bag packing subsystems, and shipping subsystems, in addition to other contemplated subsystems, each subsystem being substantially automated. The methods may be adapted to control sequencing of a trucking yard, such as directing the yard operator as to which trucks at the facility need to be received first, as opposed to receiving trucks in a first to arrive order.

The system 10 is substantially automated and multi-functional and provides various benefits, including labor reduction per order, lower initial costs, and reduction in building footprint for the facility. The computer system includes software that synchronizes various order-fulfillment functions and processes, including the sequence of various sized shipping containers or pick totes (when in the picking function) or various sized vendor cases or item containers (when in the decanting function) with inventory/donor containers from an automated storage and retrieval system at a goods-to-person (GTP) or goods-to-robot (GTR) workstation to maximize productivity of the operators and throughput of the facility. The computer system and respective software may interleave single line orders (i.e. single-item orders) and multi-line orders (i.e. multiple-item orders) during order fulfillment at a single workstation. Further benefits include: shorter timelines from order receipt to customer delivery as a function of the discrete picking arrangement for the operator and reduced conveyance path due to proximity of pick/decant workstations to the output of the automated storage and retrieval system; reduction in facility footprint as function of effective use of the building volume; minimization of equipment utilization as a function of multi-purpose pick/decant workstations, multi-purpose sequencing towers, universal carton erectors, and universal automated packing stations; optimized/synchronized sequencing made possible due to abundance of buffers in the sequencing tower to accommodate timing challenges typically arising from a lack of hardware availability; optimization of the labor force to reduce task starvation of the operators as a function of automated carton erection, dual transfer process (inter-aisle/short transfers and long transfers) of inventory totes among automated storage and retrieval aisles, and automated packing; and optimization of the labor force as a function of reducing the hands-on requirements typically associated with handling and tracking "shorts" by utilizing the sequencing towers to temporarily store partially-filled orders (i.e. short orders) until the rest of the inventory is available at the picking station.

The system 10 includes a sequencing tower 14 that includes an elevator or lift arrangement 20 that services various rack levels 22 of the tower 14 to input or retrieve items or containers to the various rack levels 22. The rack levels 22 are configured to store containers, such as empty shipping cartons 24 and empty inventory/pick totes 26, and/or items, such as vendor cases 28. An exemplary lift 20 may be that described in commonly assigned U.S. Pat. No. 9,555,967, issued Jan. 31, 2017, which is hereby incorporated herein by reference in its entirety. The lift includes a lift platform 30 operably disposed on a vertical mast 32. The lift platform 30 includes a plurality of driven rollers or a driven conveyor to direct items or containers to or from the rack levels 22. The sequencing tower 14 may include buffer conveyors, such as in-rack conveyors, at each rack level 22, the buffer conveyors configured to buffer items or containers between the storage locations in the respective rack level 22 and the lift platform 30. The sequencing tower 14 operates as a hub or buffer location to receive, hold, and discharge shipping cartons 24, pick totes 26, individual items, and/or vendor cases 28 prior to releasing the respective item or container to a pick/decant workstation 18 that is disposed in transport communication (e.g. connected by conveyors or other types of transport systems) adjacent to said sequencing tower 14. An exemplary pick/decant workstation 18 may be that described in commonly assigned U.S. patent application Ser. No. 16/829,134, filed Mar. 25, 2020, and U.S. Pat. No. 8,713,899, issued May 6, 2014, U.S. Pat. No. 9,604,781, issued Mar. 28, 2017, and U.S. Pat. No. 10,301,113, issued May 28, 2019, which are each hereby incorporated herein by reference in their entireties. It will be appreciated that the pick/decant stations 18 are configured to operate interchangeably as either an order-fulfillment/pick workstation 18a (FIGS. 9, 12A, and 12B) in which an operator retrieves items from donor totes 34 (i.e. totes containing items stored in the ASRS 16) and transfers the items to a shipping carton 24 or a pick tote 26, or as a decant workstation 18b (FIGS. 9, 11A, and 11B) in which an operator retrieves items from a vendor case 28 and transfers the items to a donor tote 34 to be subsequently stored in the ASRS 16.

Figure 8:
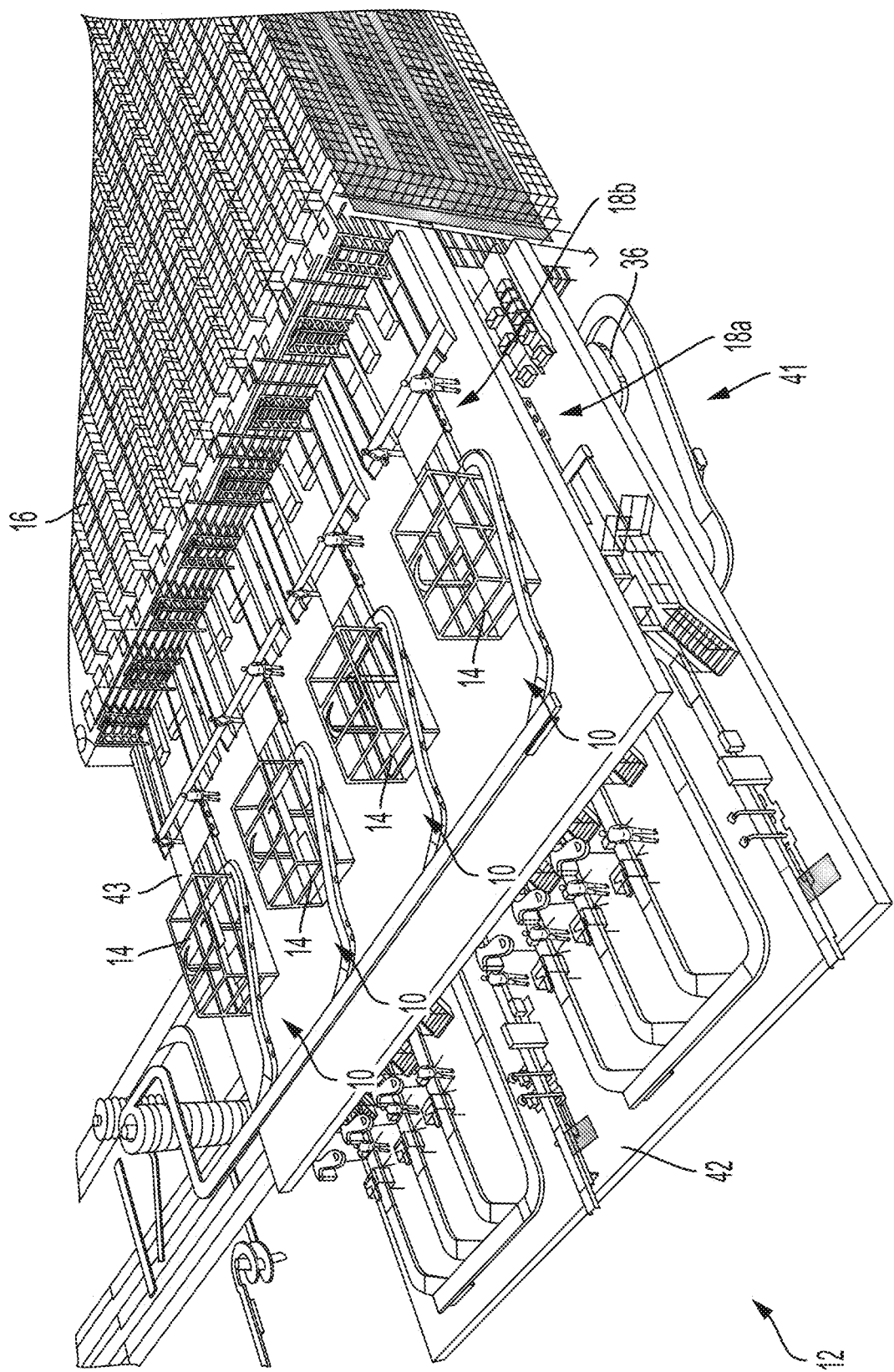
FIG. 8 is a perspective view of a system for sequencing order fulfilment subsystems in an order fulfilment facility, in accordance with an embodiment of the present invention.
Figure 9:
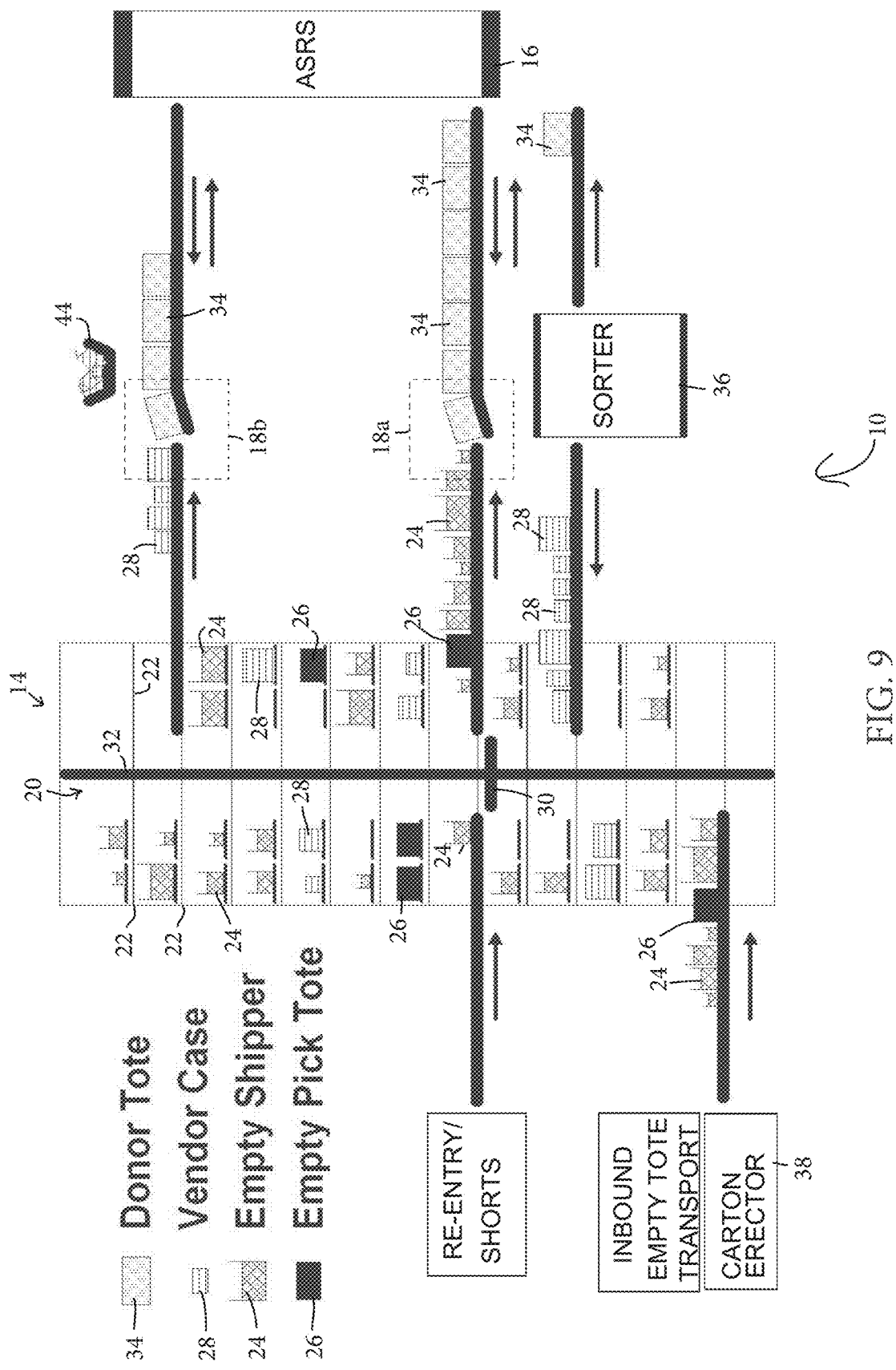
FIG. 9 is an elevation view of an exemplary sequencing tower for use in the system of FIG. 8.
Figure 10A:
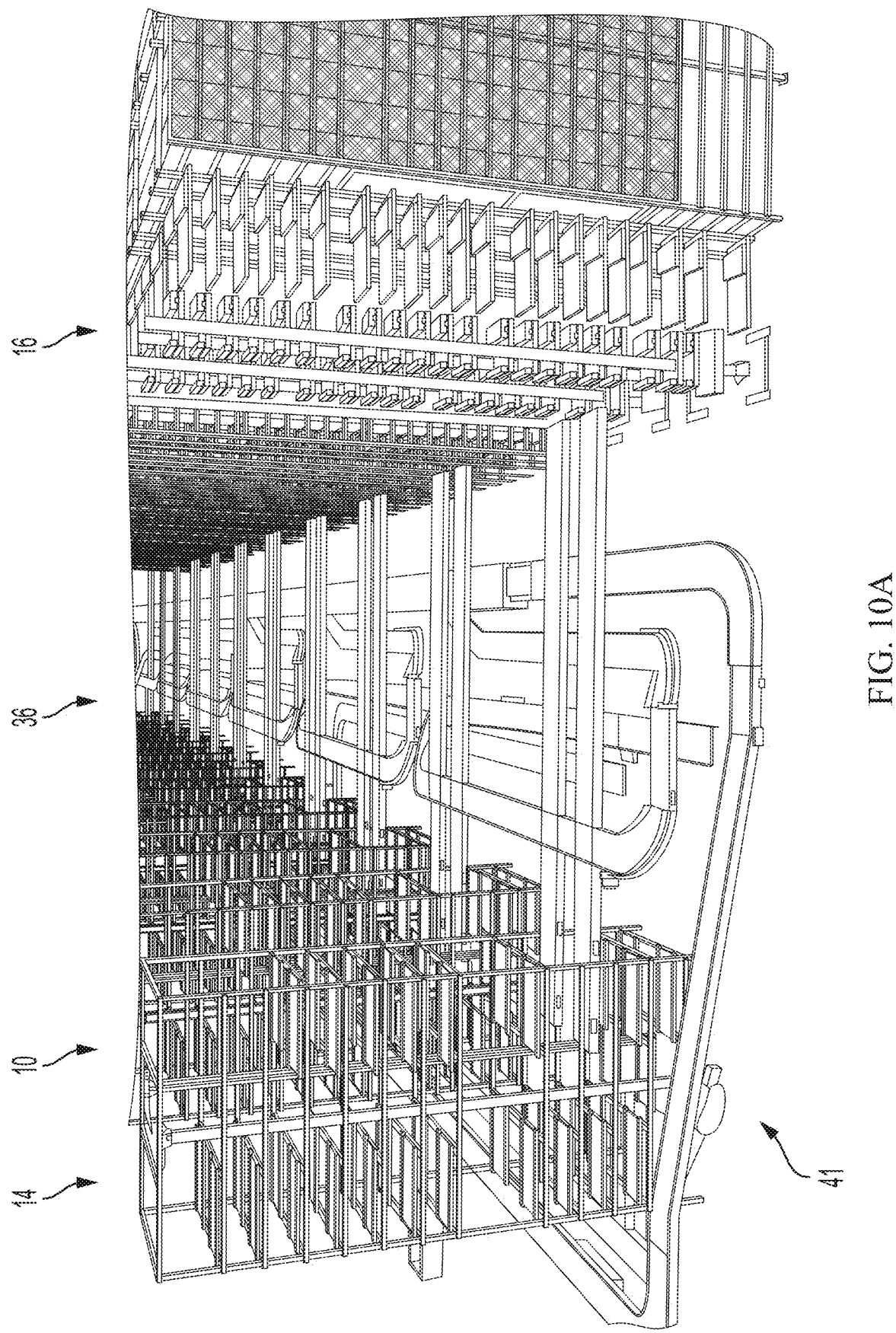
FIG. 10A is a perspective view of an exemplary sorter and an exemplary sequencing tower for use in the system of FIG. 8.
Figure 10B:
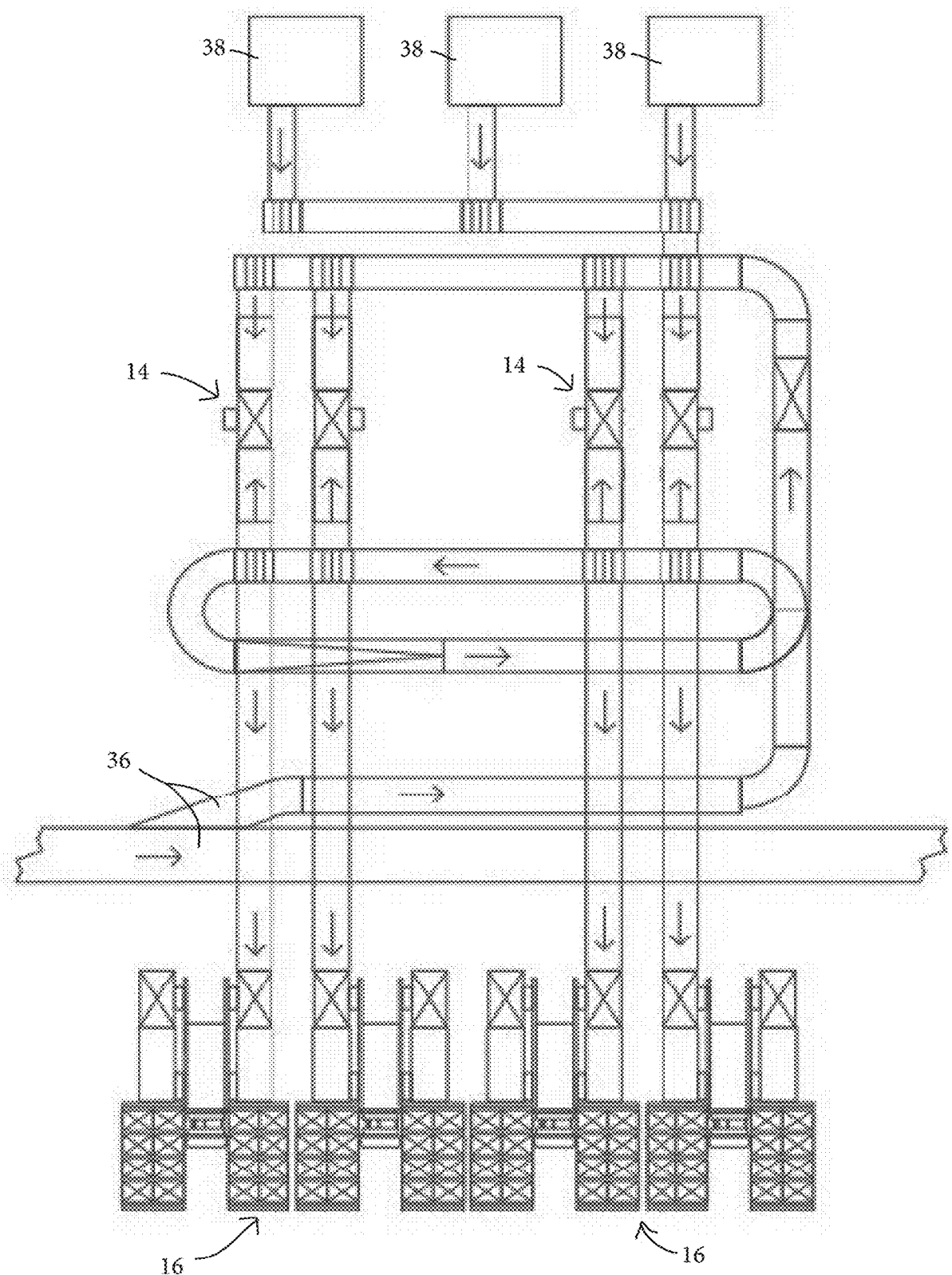
FIG. 10B is a plan view of the sorter and sequencing tower of FIG. 10A.

The sequencing tower 14 of the illustrated embodiments is in transport communication with a sortation system or infeed sorter 36 that receives inbound items and vendor cases 28 from other subsystems, such as remote ASRS aisles, a receiving subsystem, a centralized decant subsystem, or the like. The sequencing tower 14 may be in direct transport communication with the ASRS 16 via the sorter 36. An exemplary sorter may be as described in commonly assigned U.S. Pat. No. 7,086,519, issued Aug. 8, 2006, which is hereby incorporated herein by reference in its entirety. The sorter 36 is capable of various material handling functions, including: directing inbound vendor cases 28 into the sequencing tower 14; transferring donor totes 34 from corresponding aisles of the ASRS 16 to other aisles of the ASRS 16 that are not efficiently connected via an inter-aisle transfer system to the corresponding aisles (a process referred to as a long transfer); directing donor totes 34 from other subsystems into the sequencing tower 14; and directing empty donor totes 34 into either the sequencing tower 14 or the ASRS 16 as necessary. A shipping container or carton erector 38 may be provided in communication with the sorter 36 or sequencing tower 14 and is provided for erecting shipping cartons 24 of various desired sizes which are subsequently directed to the sequencing tower 14 (FIGS. 8, 9, and 10B). An exemplary carton erector 38 may be an on demand packaging machine, such as marketed and sold by Packsize International, Inc. It will also be appreciated that the sorter 36 may be omitted, such that the sequencing tower 14 primarily functions as a buffer for the adjacent workstations 18.

Figure 11A:
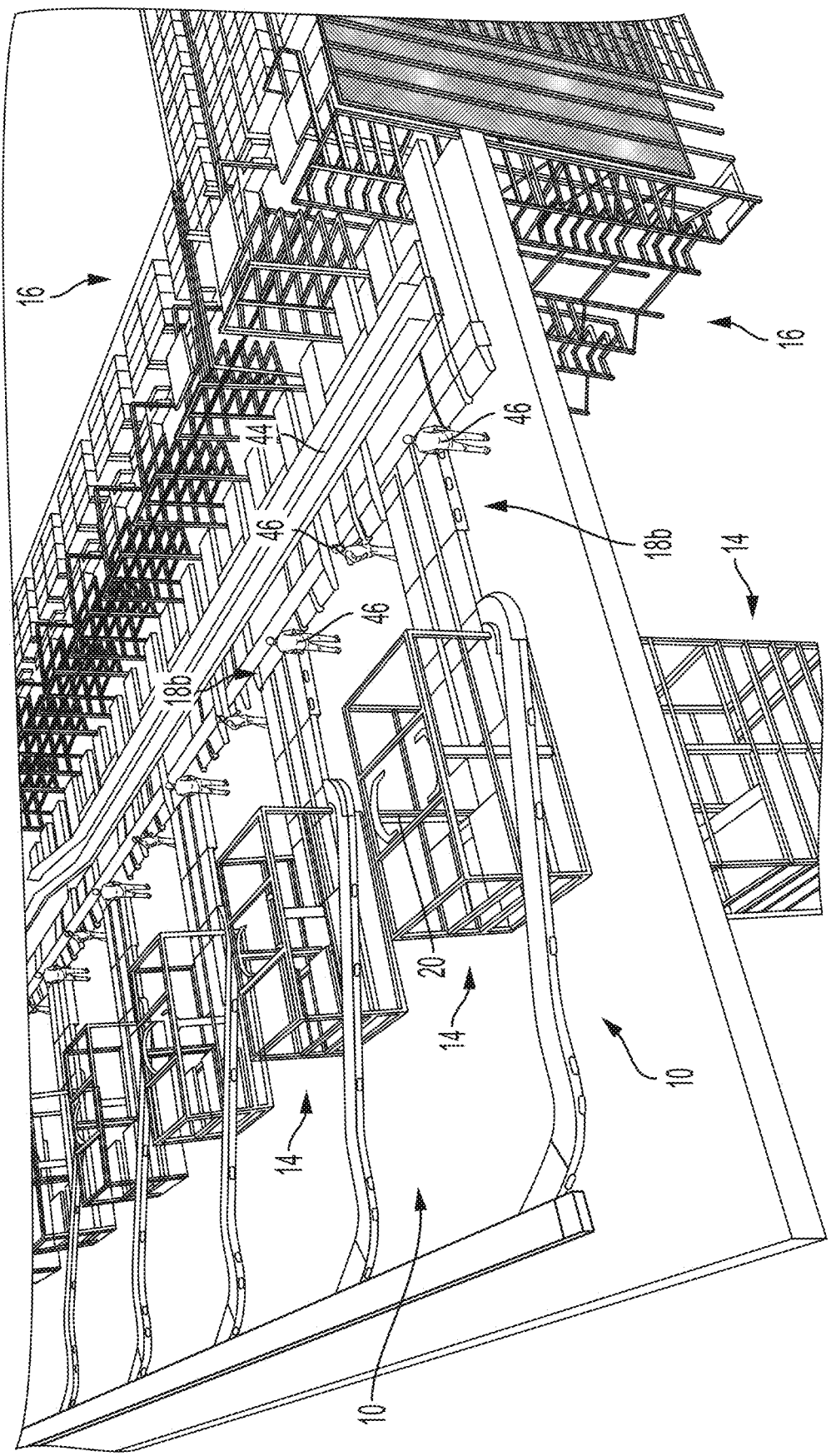
FIG. 11A is a perspective view of an exemplary goods-to-person pick workstation for use in the system of FIG. 8.

As illustrated in FIG. 8, a plurality of order-fulfillment and decant sequencing systems 10 can be deployed within a particular facility 12 or portion of a facility 12, with the computer system 13 controlling all of the systems 10 in the facility 12. Referring to the illustrated embodiment of FIG. 8, the exemplary order-fulfilment facility 12 includes three floor levels: first/base level 41, second level 42, and third level 43 which are accessible to operators and autonomous vehicles. The sorter 36 which services each of the systems 10 is disposed at the base level 41, each system 10 in the facility includes a workstation 18 configured to operate primarily as a pick station 18a disposed at the second level 42, and a workstation 18 configured to operate primarily as a decant station 18b disposed at the third level 43, with the sorter 36, pick stations 18a, and decant stations 18b adjacent to and in transport communication with the sequencing tower 14 and the respective floor level. The sequencing tower 14 is accessible at the multiple levels to infeed or outfeed the sequencing tower (pick, decant, etc.). While the configuration of the order-fulfilment facility 12 of FIG. 8 is configured in such a manner with three floor levels, it will be appreciated that the configuration may be chosen as desired with additional or fewer levels, such as with more or fewer reconfigurable workstations 18, as necessary to meet throughput requirements in the facility. For example, any level containing workstations 18 could be configured for any type of service, e.g. all workstation levels could be utilized for pick functions, all workstation levels could be utilized for decant functions, one level could be utilized for pick functions and two levels could be utilized for decant functions, etc. It will be appreciated that due to the reconfigurable nature of the workstations 18 being capable of operating as either pick stations 18*a* or decant stations 18*b*, the workstation levels can be operated differently at different times of the day, as needed. The workstations 18 can be reconfigured substantially instantaneously as soon as all prior functions have completed, however, preferably the workstations 18 are not changed too often, which may create inefficiencies in the system. The workstations 18 may include a trash conveyor or take-away lane 44, as shown in FIGS. 9 and 11A, which is particularly useful for removal of trash and waste after decant operations, but may by otherwise unnecessary for pick operations. The take-away lane 44 may be omitted if not needed, but may be provided and controlled by the computer system 13 to only operate when required.

Figure 11B:
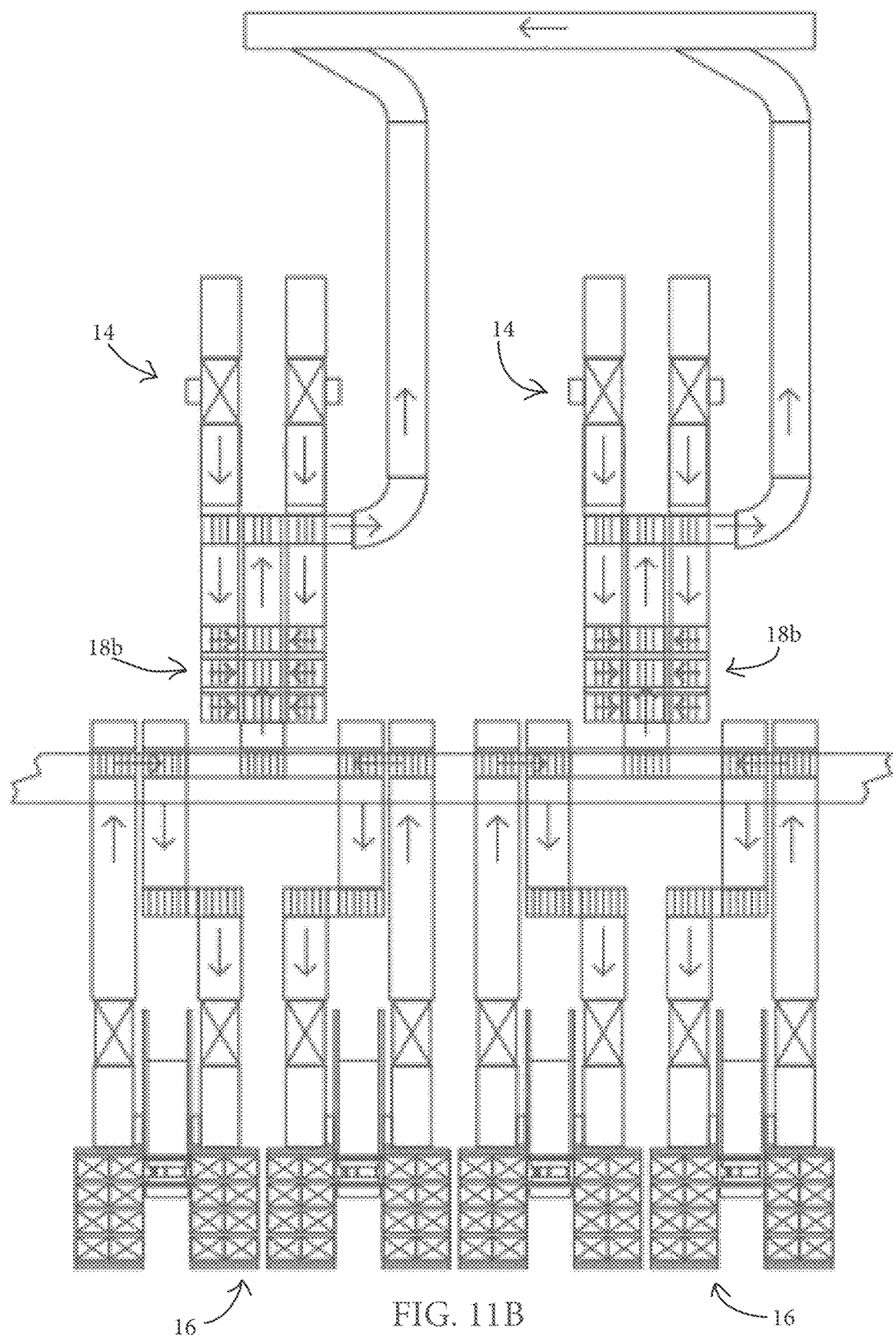
FIG. 11B is a plan view of the goods-to-person pick workstation of FIG. 11A.

Referring to the illustrated embodiments of FIGS. 11A and 11B, the workstations 18 depicted are configured to function primarily as decant stations 18*b*. The decant station 18*b* is particularly well-suited for sequencing of inbound items to be placed in donor totes 34 for subsequent storage in the ASRS 16. For example, items, in the form of inbound items or vendor cases 28, are discharged from the sequencing tower 14 to the decant station 18*b* and donor totes 34 (either empty or partially filled) are discharged from the ASRS 16 to the decant station 18*b*, such that the vendor cases 28 and donor totes 34 arrive substantially simultaneously at the decant station 18*b*. The decant operator 40 unloads the vendor cases 28 and places the inventory item into the donor tote 34, preferably in a portion/compartment of the tote 34 to maximize volume usage of the tote 34. A method 400 for optimizing volume usage in donor totes 34 is described in further detail below. Once the donor tote 34 has received the necessary items it is discharged from the decant station 18*b* to the ASRS 16 for storage. Optimized sequencing of inbound items with empty/partially empty donor totes 34 eliminates the need for upstream consolidation operations that are typically required to decant items and ensure proper subsequent placement into the ASRS 16. Preferably, each compartment in a donor tote is "SKU pure" (i.e. if multiple inventory items are stored in a single compartment, those items are all identical to one another). The computer system 13 and a program may control the size of the donor totes 34, or the size of empty compartments of a tote 34, that are released from the ASRS 16 to meet but not greatly exceed the size required for the decanted item(s) in a manner to optimize volume usage of the donor tote 34. It will be appreciated that decanted items may be added to compartments already containing items (preferably of the same SKU, i.e. SKU pure), however, it will typically be preferable to only decant into empty containers, or empty compartments in a container, as it is more resource and time efficient to do so.

Figure 12A:
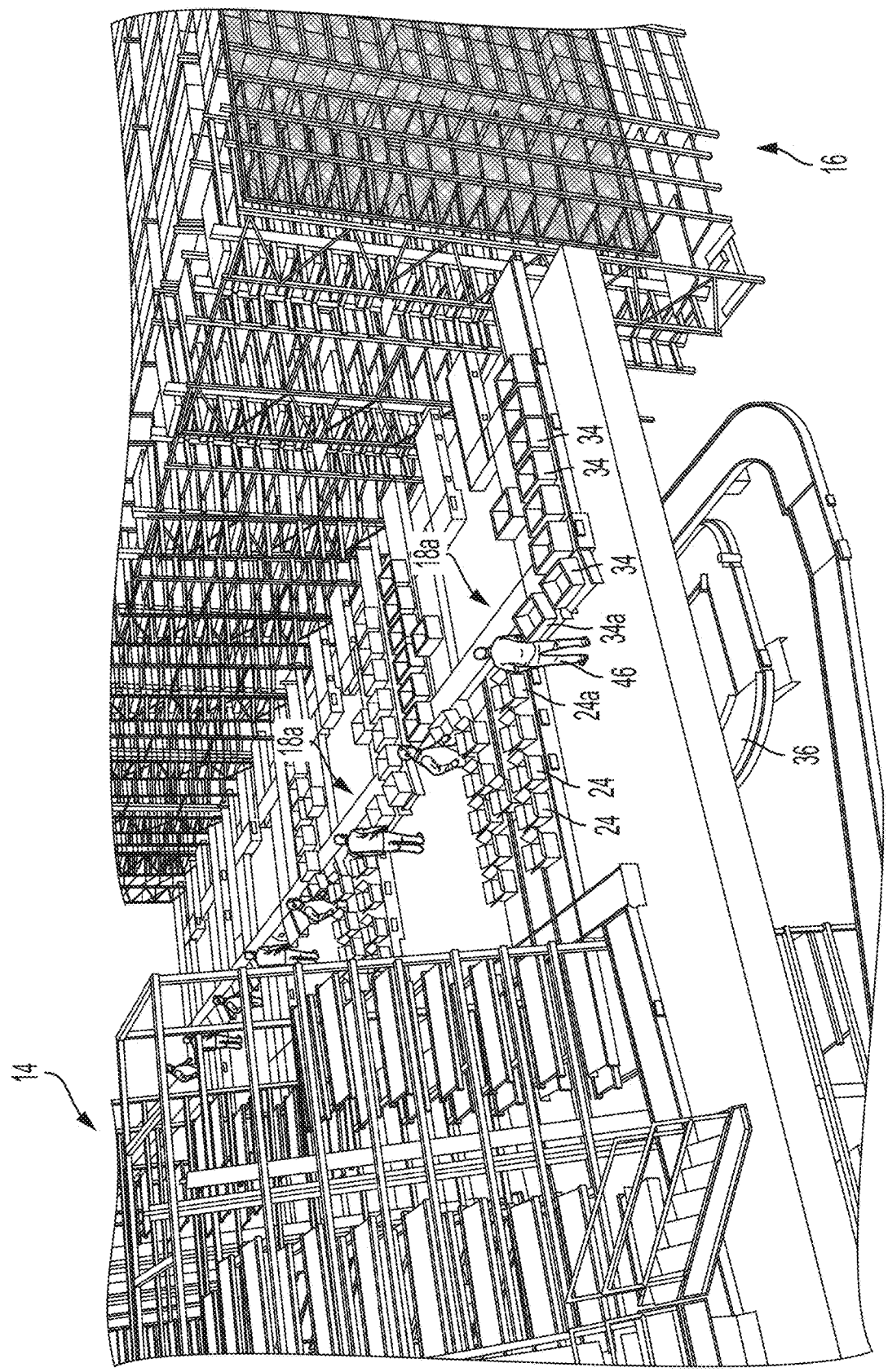
FIG. 12A is a perspective view of an exemplary goods-to-person decant workstation for use in the system of FIG. 8.
Figure 12B:
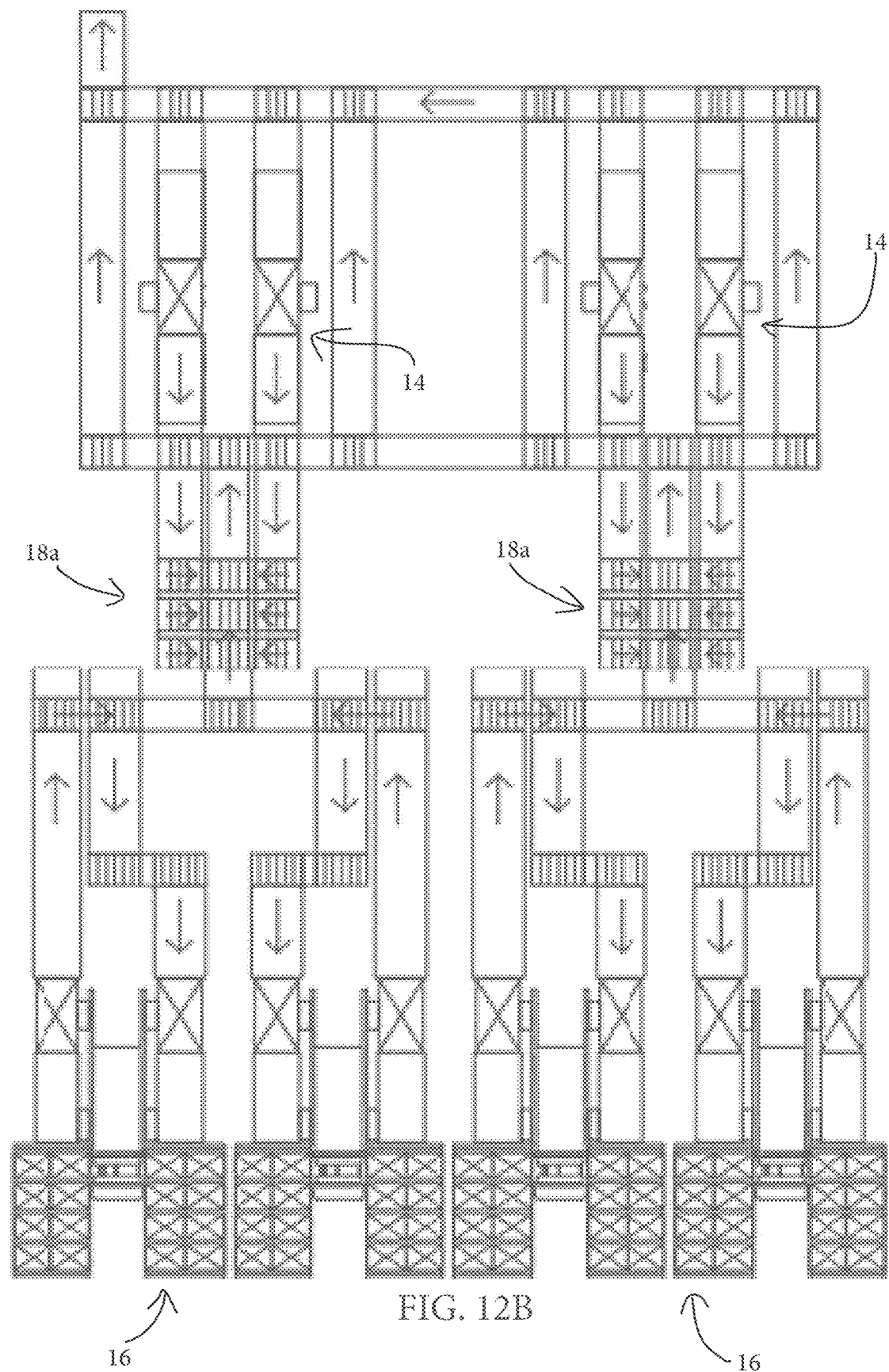
FIG. 12B is a plan view of the goods-to-person decant workstation of FIG. 12A.

Referring to the illustrated embodiments of FIGS. 12A and 12B, the workstations 18 depicted are configured to function primarily as pick stations 18*a*. The pick station 18*a* is particularly well-suited for sequencing of empty shipping containers/cartons 24 or empty pick totes 26 from the sequencing tower 14 and inventory items delivered to the pick station 18*a* in donor totes 34 from the ASRS 16. For example, inventory items, stored in donor totes 34, are discharged from the ASRS 16 to the pick station 18*a* and empty shipping cartons 24 are discharged from the sequencing tower 14 to the pick station 18*a*, such that the empty carton 24 and the donor tote 34 arrive substantially simultaneously at the pick station 18*a*. The pick operator 46 transfers the required item from the donor tote 34 to the shipping carton 24, which, once fulfilled, is subsequently discharged downstream to another subsystem, such as a shipping subsystem. For another example, inventory items, stored in donor totes 34, are discharged from the ASRS 16 to the pick station 18*a* and an empty/partially empty pick tote 26 is discharged from the sequencing tower 14 to the pick station 18*a*, such that the pick tote 26 and the donor tote 34 arrive substantially simultaneously at the pick station 18*a*. The pick operator 46 transfers the required item from the donor tote 34 to the pick tote 26, which, once fulfilled, is subsequently discharged downstream to another subsystem, such as a another pick station to receive more order items, or to a packing subsystem. Methods 100, 200, and 300 are provided for optimizing the sequencing of shipping cartons 24 or empty inventory totes 26 from the sequencing tower 14 with donor totes 34 from the ASRS 16 is discussed in further detail below. Once the operator 46 has retrieved the required items from the donor tote 34, the tote 34 is discharged from the decant station 18*b* back to the ASRS 16 for storage.

The pick station 18*a*, as illustrated in FIG. 12A, may receive or sequence multiple empty shipping cartons 24 or pick totes 26 simultaneously such that they are each accessible to the pick operator 46 to allow the operator to pick multiple orders simultaneously. Multiple donor totes 34 may also be discharged to the pick station 18*a* simultaneously such that the operator 46 may retrieve items from multiple donor totes 34 to efficiently fulfil an order. In a preferred embodiment, the computer system 13 and program sequence the flow of cartons/pick totes and donor totes such that the first container which is closest to the operator 46 (shown as an empty carton 24*a* in FIG. 12A) is provided for the primary order being picked and the first donor tote 34*a* includes the items to be picked for the primary order into the first carton 24*a*. In this manner, the operator 46 is required to move the shortest distance to transfer items from the donor totes to the required carton/pick tote, thereby maximizing the operator's throughput while minimizing operator fatigue. The operator 46 may pick items from the first donor tote 34*a* (or subsequent donor totes 34) to the other shipping cartons/pick totes that are present at the pick station 18*a*, which maximizes the operator's time and throughput efficiency as the donor totes 34 are cycled through, if necessary.

The sequencing tower 14 may be configured to receive and buffer oversized order items that would not otherwise fit in pick totes or donor totes. Thus, the pick station 18*a* may be configured to receive and handle the oversized units that do not otherwise fit in totes. For example, the sequencing tower 14 may buffer and subsequently release an oversized item and a respectively large empty shipping carton to the picking station 18a, where the operator 46 can transfer the oversized item into the large shipping carton. The computer system 13 and program may batch and sequence multiple items that represent single-item orders that require bagging at a downstream bagging subsystem. For example, donor totes 34 from the ASRS 16 containing items for single-item orders are discharged to the pick station 18a and an inventory tote 26 is discharged to the pick station 18a from the sequencing tower 14. The inventory tote 26 is provided to receive multiple items that make up multiple single-item orders. Once the inventory tote 26 has been filled with the items for the single-item orders it is discharged from the pick station 18a to a downstream bagging subsystem where a bagging operator retrieves and bags each item individually from the inventory tote 26 to complete the order and subsequently ship the bagged single-item order.

The order-fulfilment facility 12 may include various optional or auxiliary subsystems which are in transport communication with the system 10 and controlled and monitored by the computer system 13. Auxiliary subsystems include, but are not limited to: the previously discussed automatic shipping carton erectors; a finishing and final packing subsystem; a receiving subsystem; a centralized decant subsystem; a manual packing subsystem; a manual picking subsystem; the previously discussed bag packing subsystem; and a shipping subsystem.

The following provides brief descriptions of the above mentioned subsystems, however it will be appreciated that the following descriptions are not intended to be limiting as to the functions and capabilities of the various subsystems within the facility 12. Multiple automatic carton erectors (ACEs) may be provided in each erector subsystem that is adjacent to each sequencing tower 14. Each ACE can be configured to erect a particular sized shipping carton (e.g. one ACE for large shipping cartons, one ACE for medium cartons, and a one ACE for small cartons, etc.) The erector subsystem is in direct transport communication with the sequencing tower 14 such that the erected shipping cartons can be inducted and buffered in the tower 14 without passing through the sorter 36 first. The final packing subsystem is provided downstream of the pick stations 18a. The final packing subsystem may be fully automated and may include dunnage materials, case sealing functionality, and a rate checking and labeling system to identify, measure, label, and direct the shipping cartons. The receiving subsystem is provided upstream of the system 10 and is provided to intake incoming items into the facility 12, typically including retrieving the incoming items from a trailer or shipping container. The receiving system may include telescopic unloaders connected to a collector conveyor which cooperate to automatically receive incoming shipments of items. The receiving subsystem may include a system for automatic shipping notice acknowledgement to verify the goods received match the goods that were supposed to be shipped. The receiving subsystem may include systems to automatically measure and weigh the items or cases of items received as well as systems to create new SKU codes for items that are unique or new to the facility 12. An exemplary receiving subsystem is described in commonly owned and assigned U.S. patent application Ser. No. 16/575,803, filed Sep. 19, 2019, which is hereby incorporated herein by reference in its entirety.

The computer system 13 and software may include a putaway logic that optimizes the intake, decant, and storage processes related to the incoming item or case of items. The receiving system can provide benefits and functions including quality assurance and inbound value-added-services (VAS). A centralized decant subsystem may be disposed upstream of the system 10 to handle large scale decant operations (e.g. a full vendor case may be decanted and fully fill a donor tote 34 which can then be directly input into the ASRS 16), specialty or fragile item decant operations, oversized item or vendor case decant operations, etc. The centralized decant subsystem may be fully automated with a robotic decant system or may be at least partially manually operated by an operator. A manual picking subsystem may be disposed upstream of the system 10 to handle picking operations for items that are not suitable for the hardware of the system 10 (e.g. items that are too large, heavy, or non-uniform in shape that would be difficult or impossible to handle by a storage shuttle). The manual picking subsystem may be necessary for inbound items received on pallets or shelving. The manual picking subsystem can be configured to direct items to different storage systems within the facility 12, such as via a zone-routing conveyor system. A manual packing subsystem may be disposed downstream of the system 12 to handle standard packing operations (operations that cannot be handled at the decant stations 18b) and to process and direct the shipment of orders using a rate checking and labeling system. The bag packing subsystem, which is briefly discussed above, may be provided downstream of the system 10 to transfer items from pick totes 26 into shipping bags, which may be performed automatically. The finished orders in the bags are transferred to a bulk container, such as a gaylord, to be transported to a shipping provider (e.g. an internal distribution network, UPS, USPS, FedEx, DHL, etc.). A shipping subsystem may be provided at the downstream end of the facility 12 to handle the final shipping functions of orders when they are ready to depart the facility 12, such as sorting order cartons to appropriate trailers. The shipping subsystem may include telescopic trailer loaders that facilitate the sortation of the shipping cartons onto trailers and may facilitate the transfer of gaylords containing many orders onto trailers.

Figure 1A:
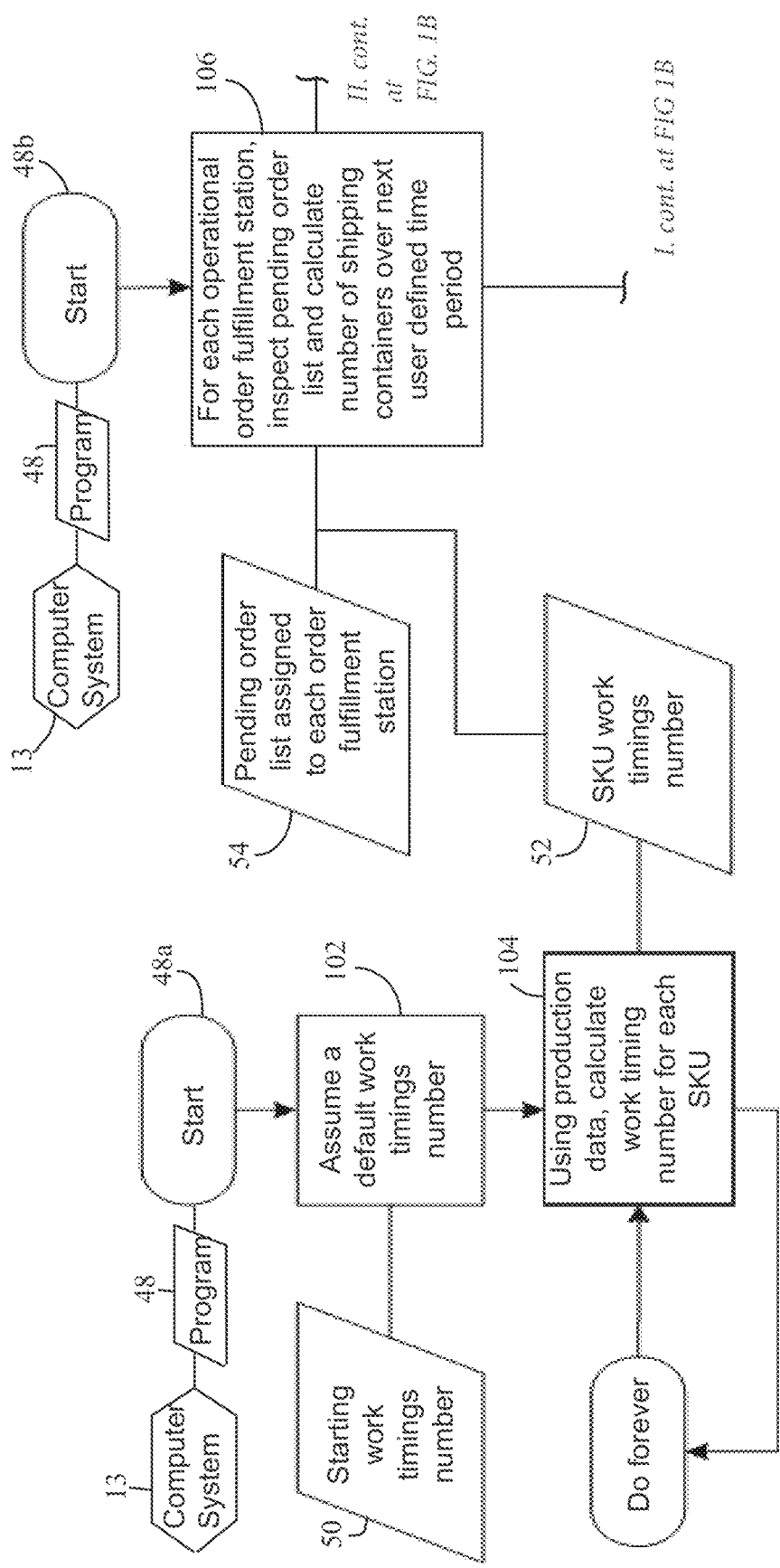
FIGS. 1A-1C are enlarged views of method processes of respective regions designated 1A-1C in FIG. 1.
Figure 1B:
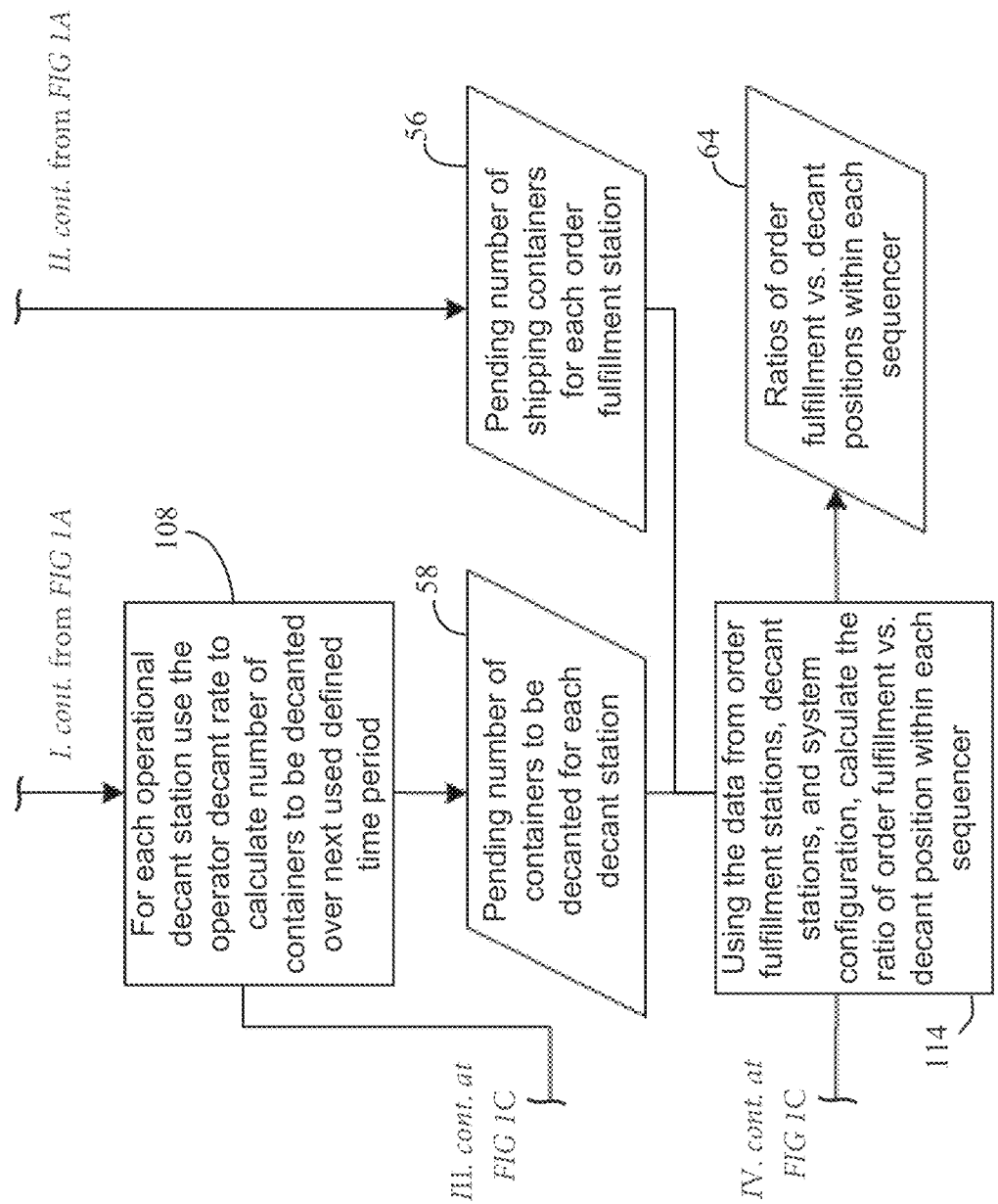
Figure 1C:
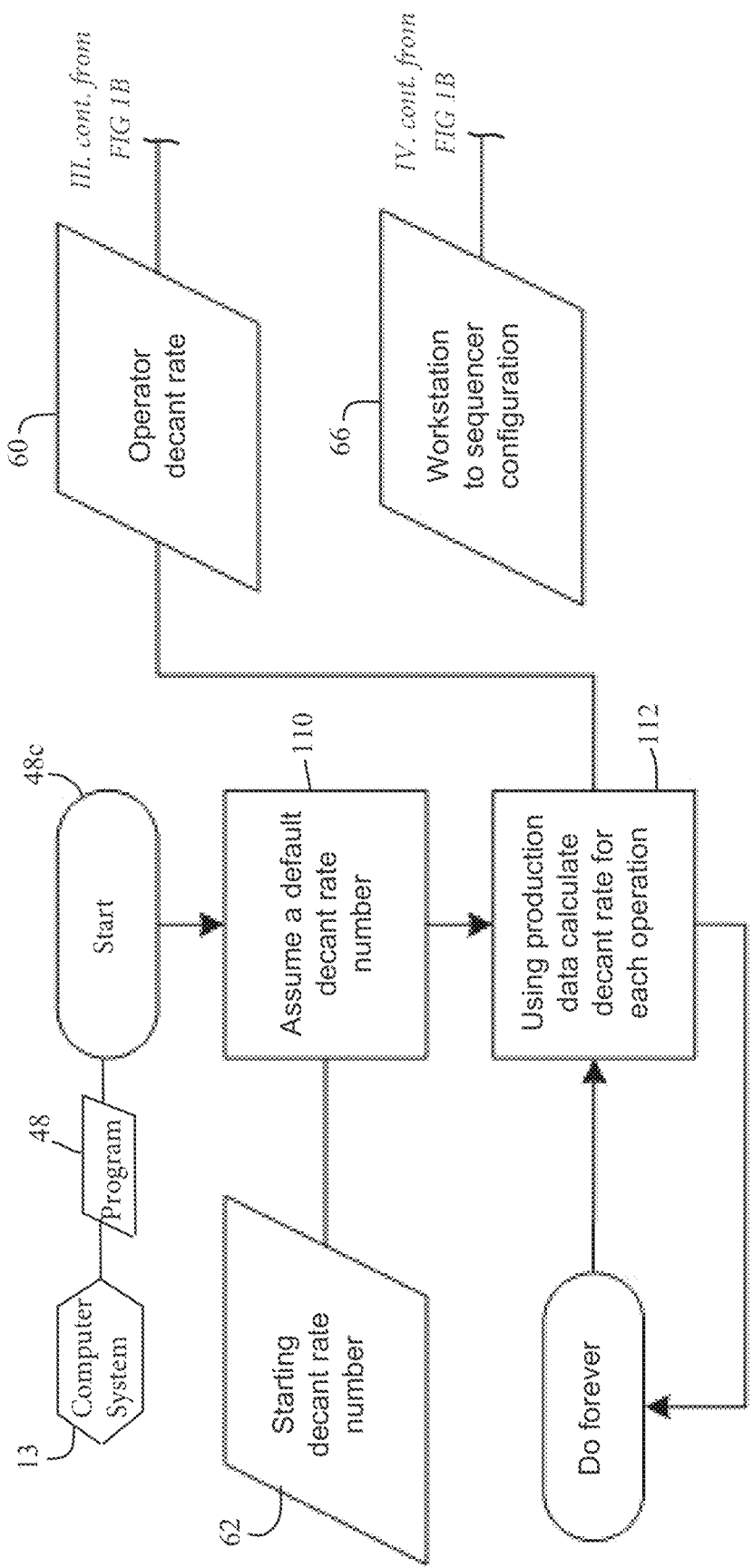
Figure 2:
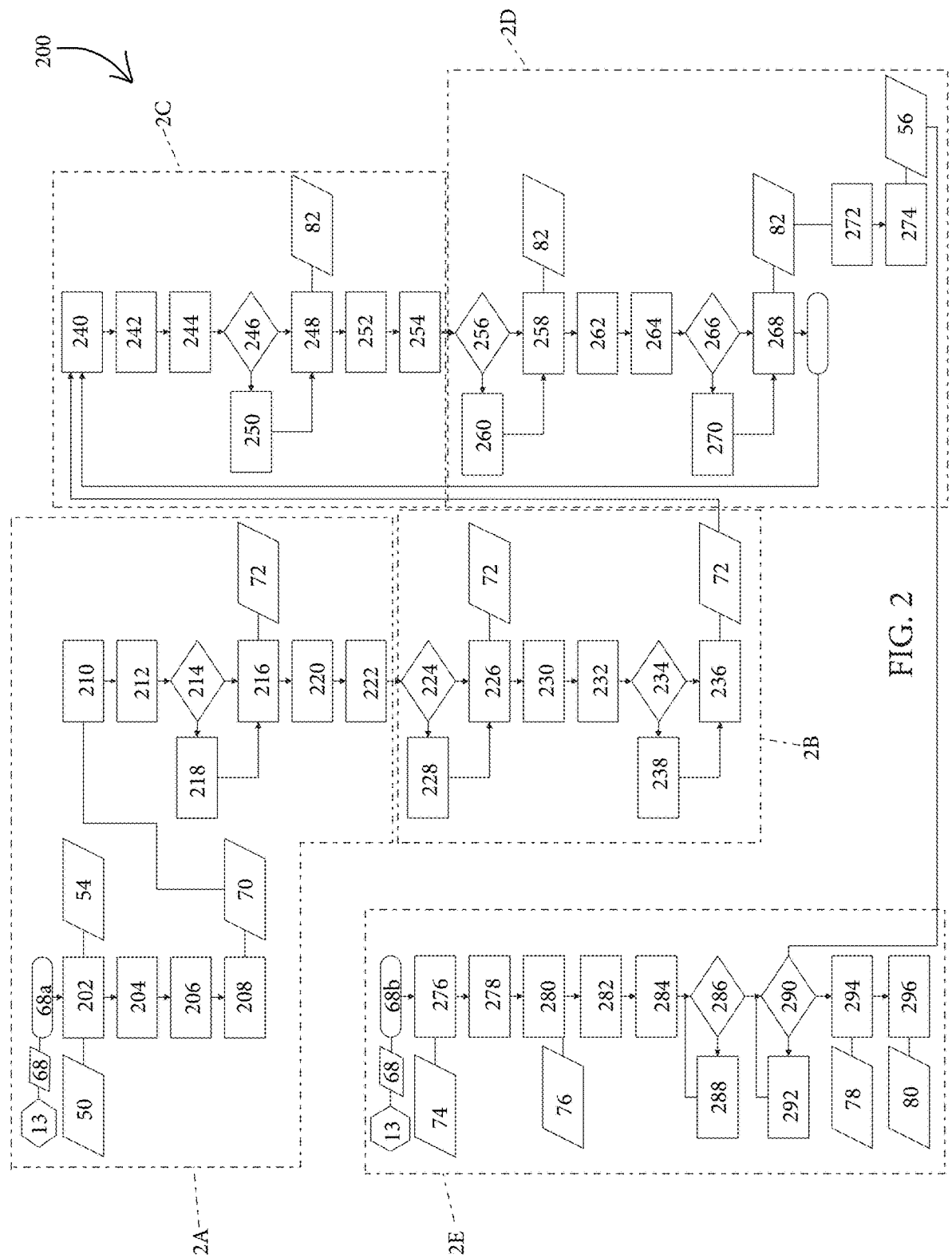
FIG. 2 is a diagram of another method for balancing and optimizing the flow of objects and containers in an automated warehouse facility, in accordance with the present invention.
Figure 2A:
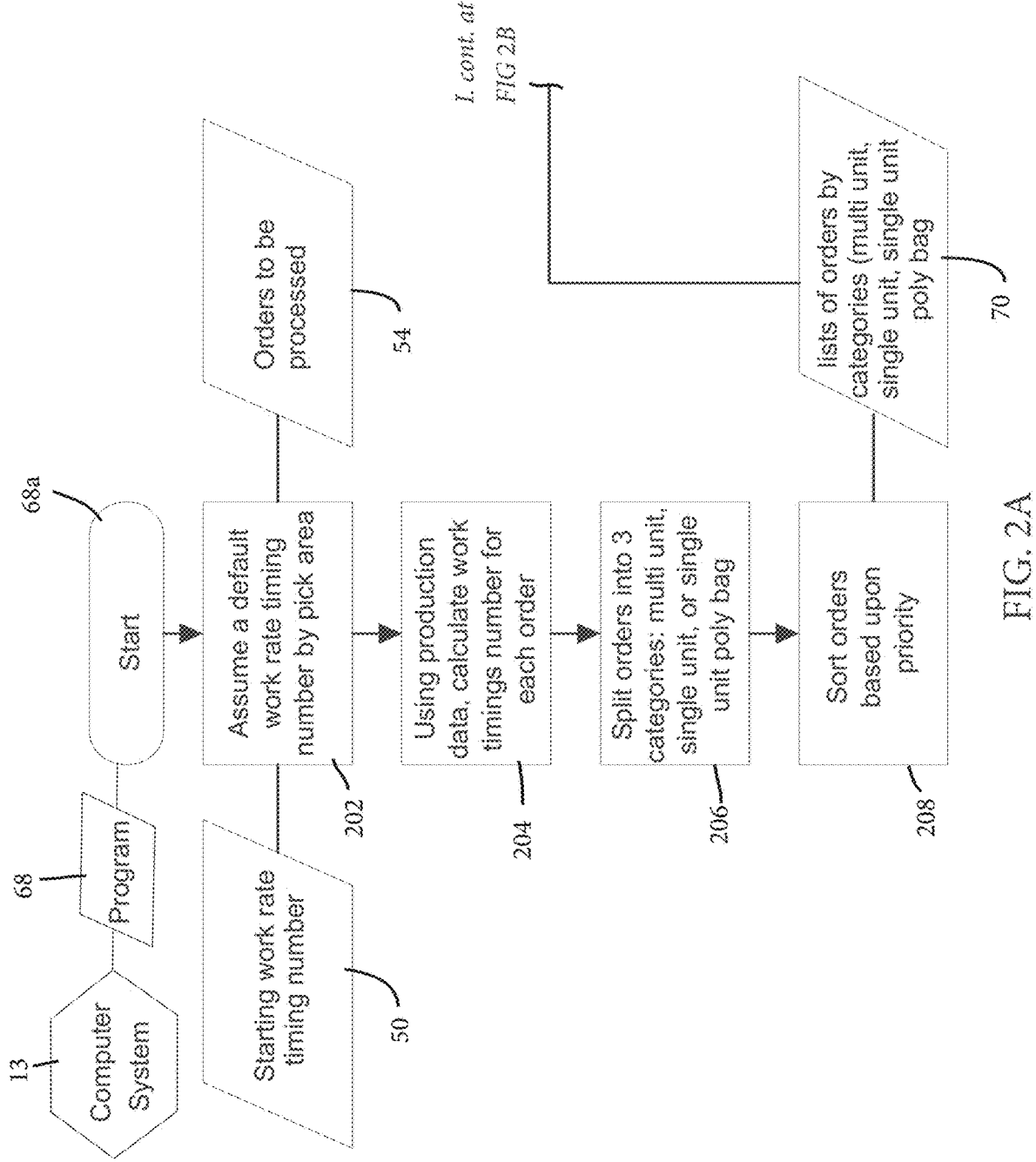
FIGS. 2A-2I are enlarged of views method processes of respective regions designated 2A-2I in FIG. 2.
Figure 4A:
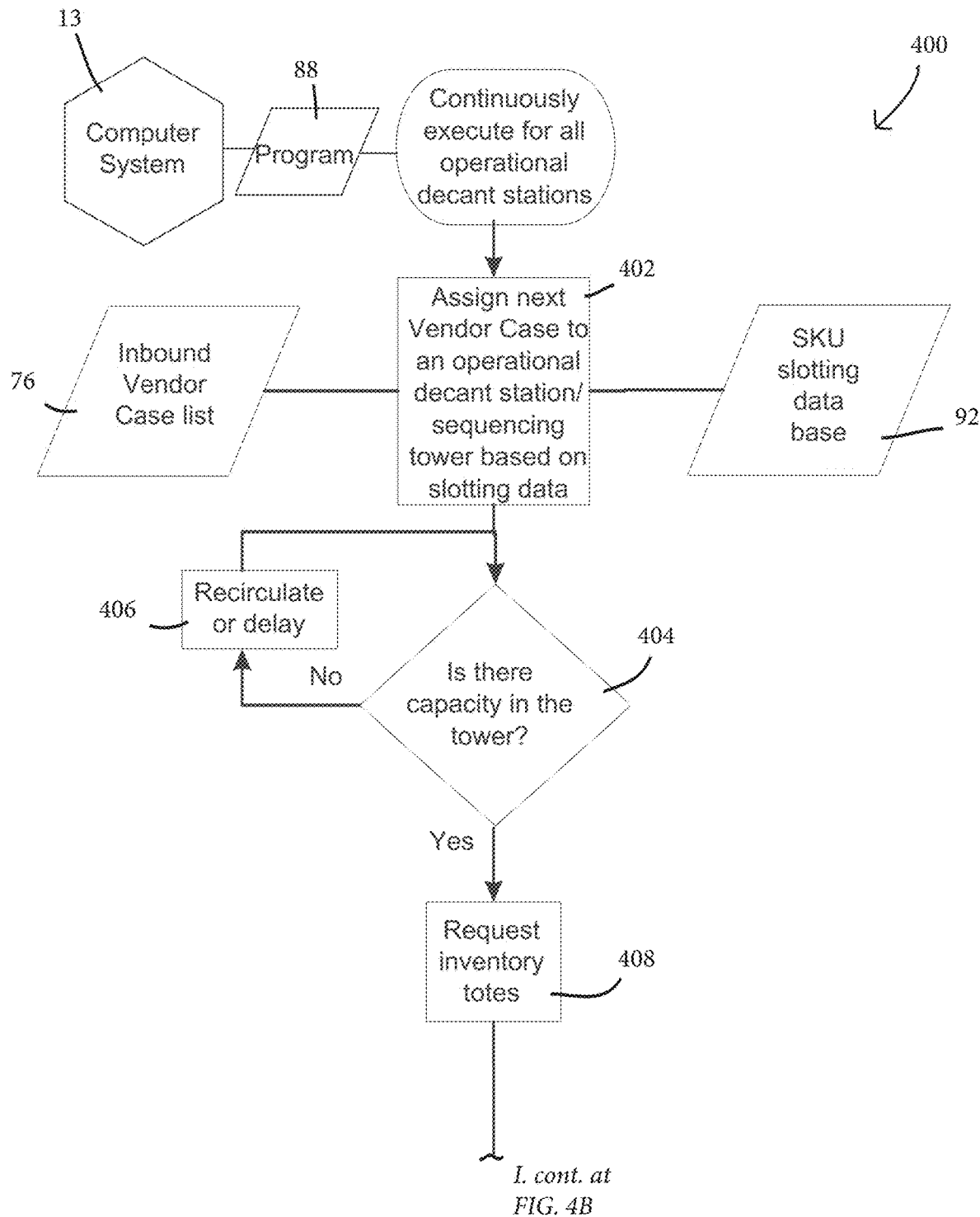
FIGS. 4A-4B are a diagram of a method for sequencing and optimizing flows of inbound items with flows of inventory containers arriving at a decant workstation in an automated warehouse facility, in accordance with the present invention.
Figure 4B:
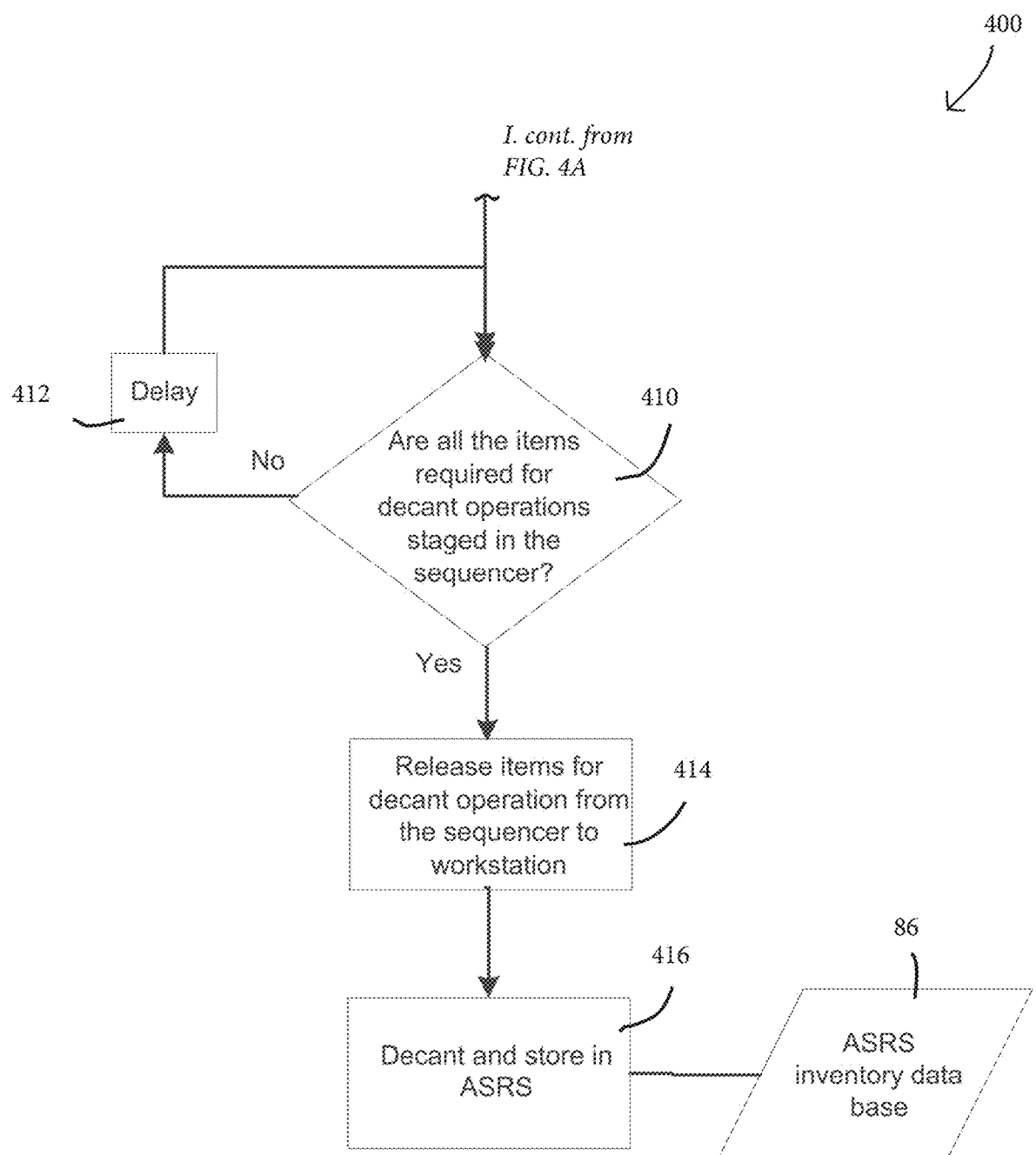
Figure 5A:
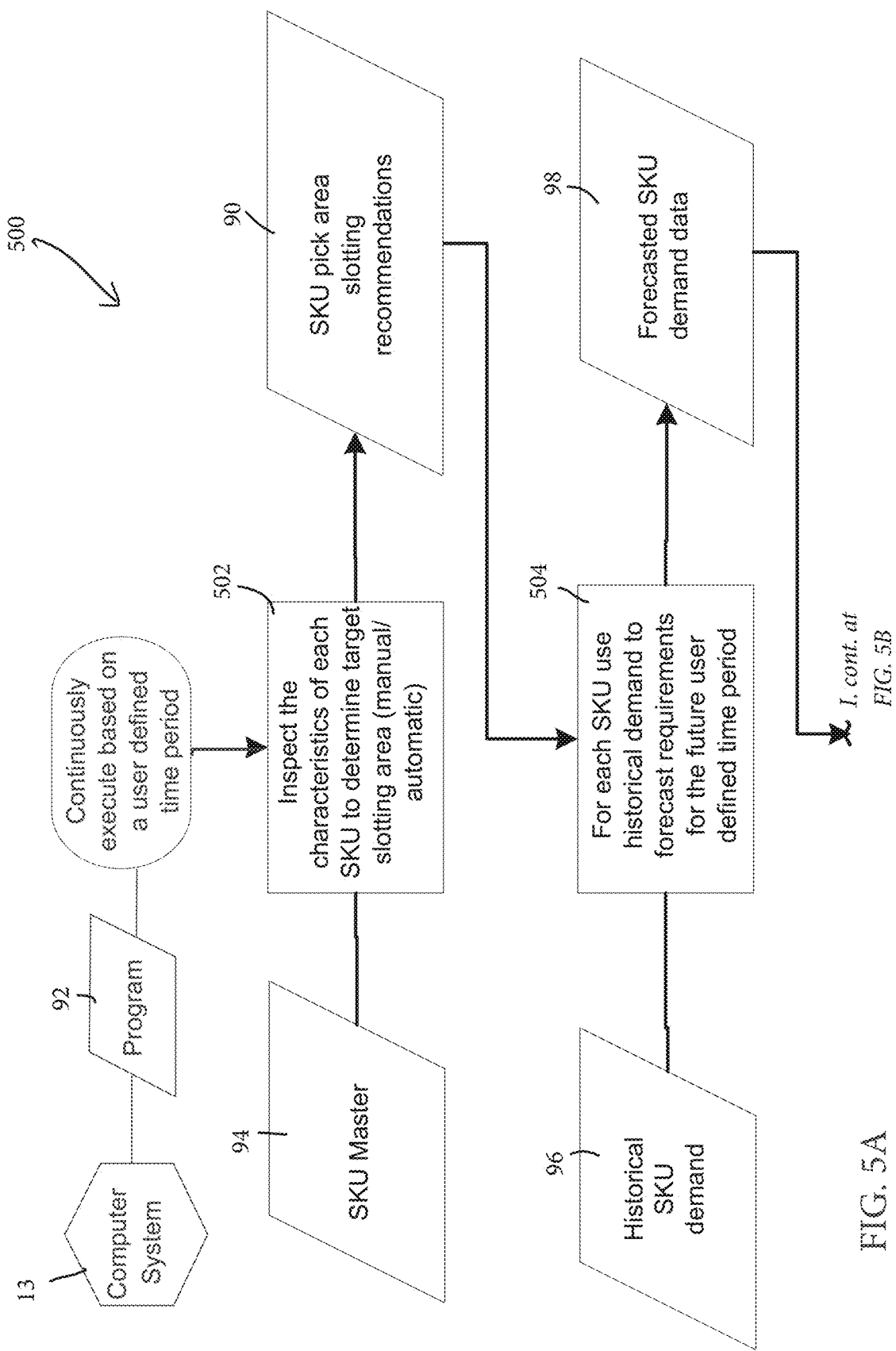
FIGS. 5A-5B are a diagram of a method for directing and optimizing the distribution of multiple of the same type of item to various different locations within an automated warehouse facility, in accordance with the present invention.
Figure 5B:
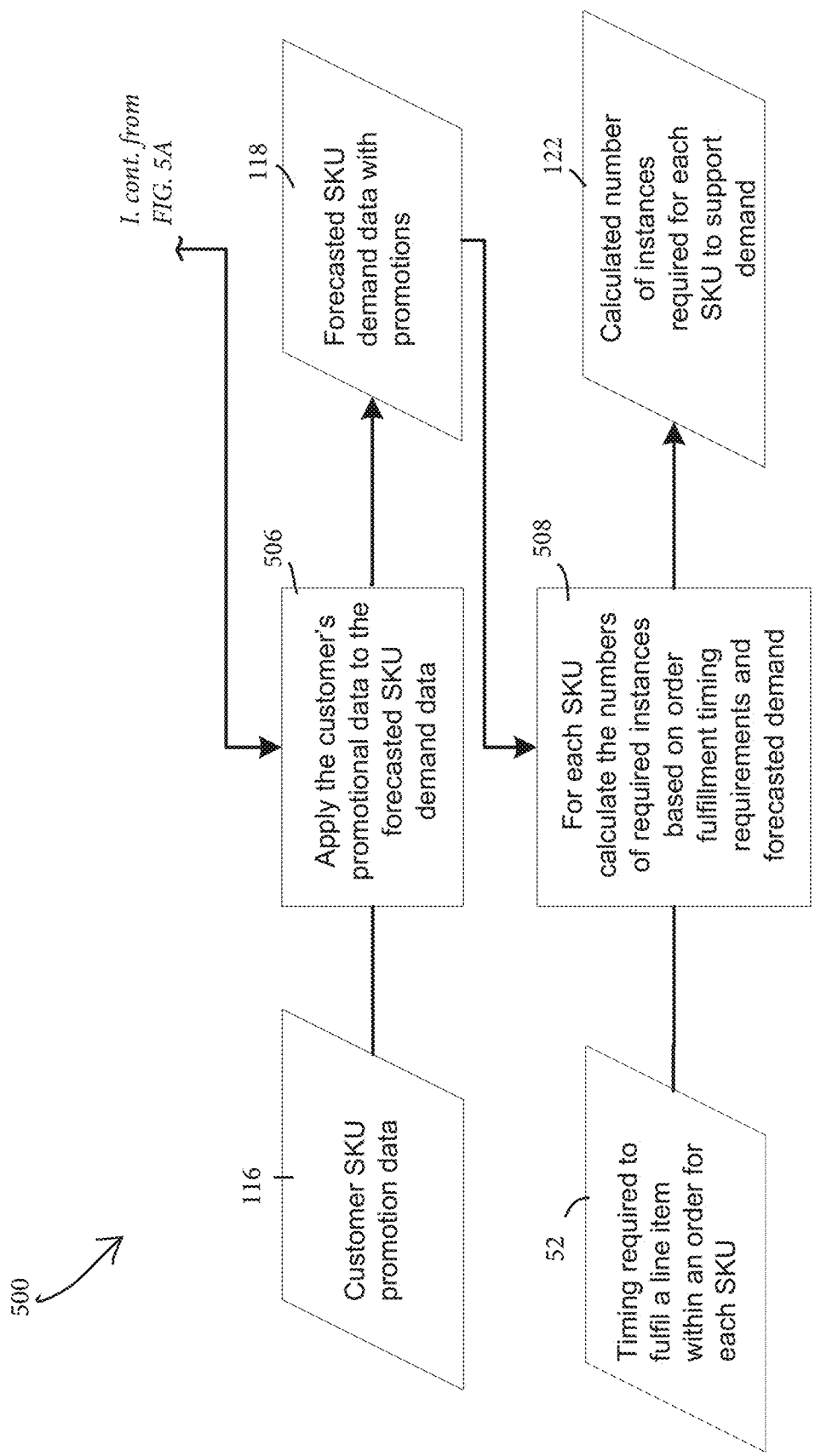
Figure 6:
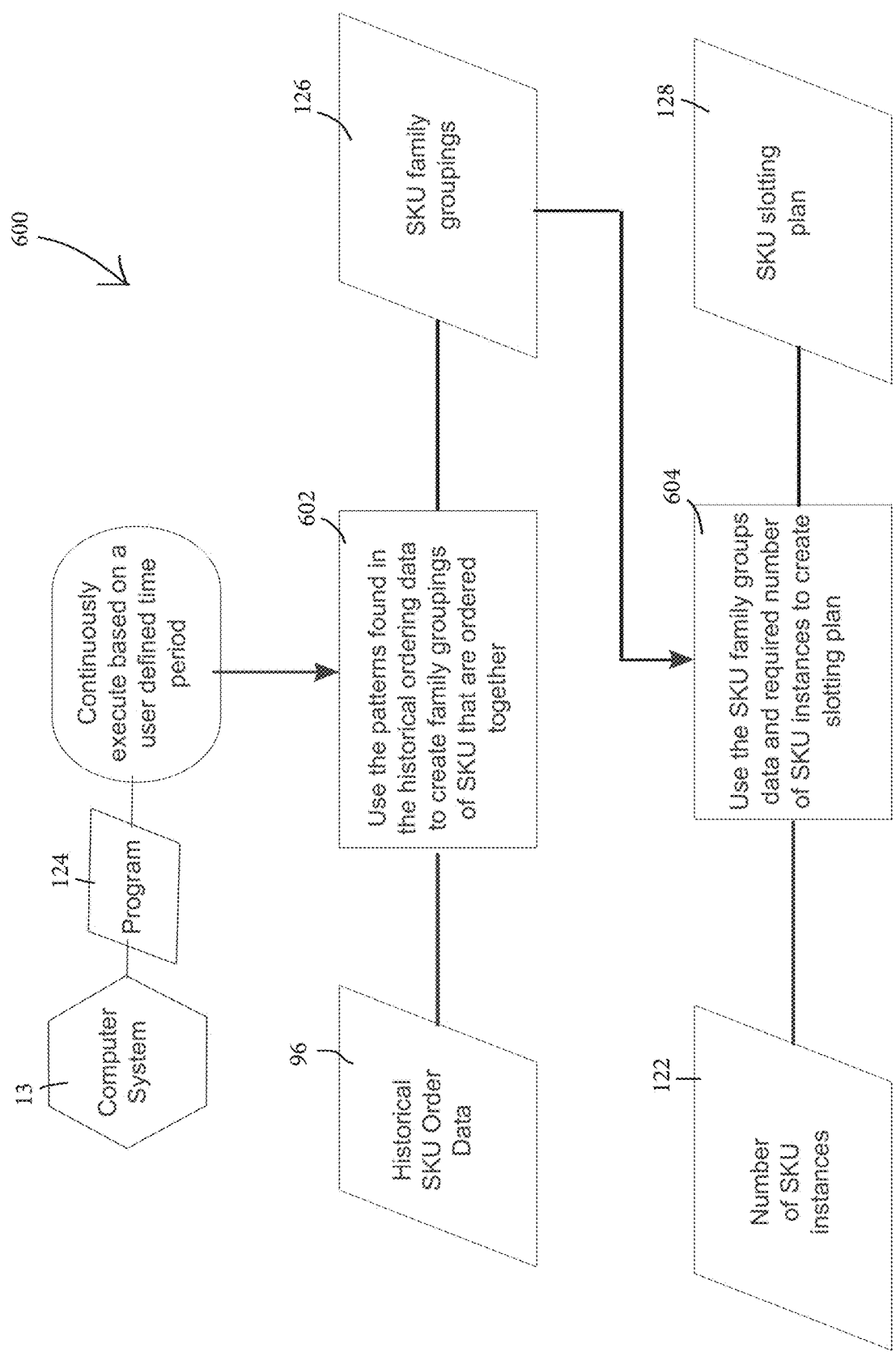
FIG. 6 is a diagram of a method for directing and optimizing the distribution of different types of items that are typically ordered together to a similar location within an automated warehouse facility, in accordance with the present invention.
Figure 7A:
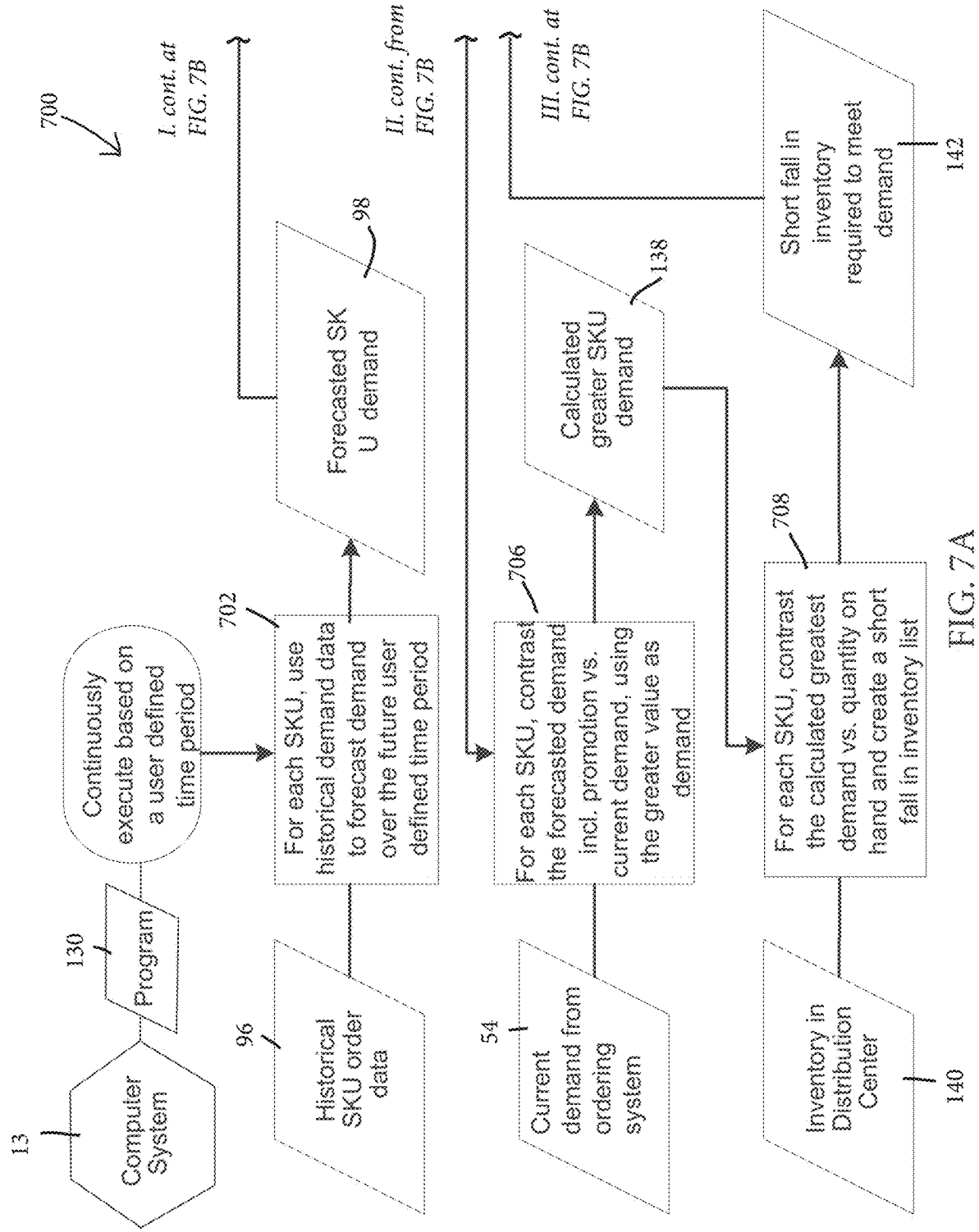
FIGS. 7A-7B are a diagram of a method for directing and optimizing the receipt and offloading of inbound trailers at an automated warehouse facility, in accordance with the present invention.
Figure 7B:
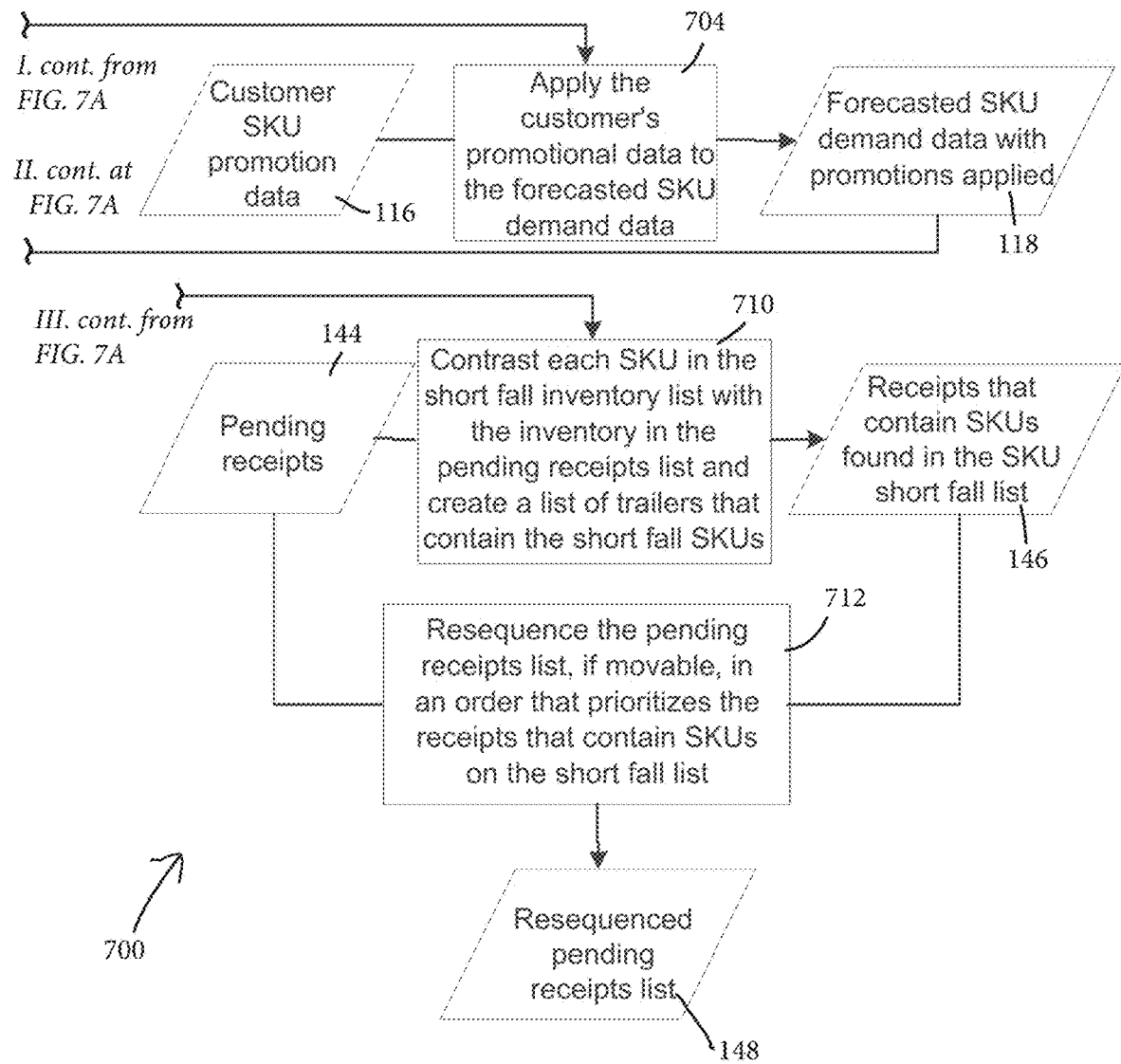

Referring to FIGS. 1-7B, the following methods, 100, 200, 300, 400, 500, 600, and 700 are provided are provided for synchronizing, balancing, and optimizing various order fulfilment processes in an order fulfilment facility 12. Method 100, as illustrated in FIGS. 1-1C, is provided for optimizing the utilization of pick stations 18a, decant stations 18b, shipping carton erectors 38, empty shipping cartons 24, empty pick totes 26, and donor totes 34 to operate the facility 12 in an efficient manner. Method 200, as illustrated in FIGS. 2-2I, is similar in many respects to method 100, while additionally optimizing sub-processes within an order fulfillment facility, including determining order configurations (e.g. multi-item orders, single-item orders, order requiring shipping containers 24, and orders requiring bags, etc.), assigning orders to a system 10 and its respective sequencing tower 14, assigning orders to pick stations 18a connected to the respective sequencing tower 14, assigning inbound items and vendor cases 28 to a system 10 and its respective sequencing tower 14, and assigning inbound items and vendor cases 28 to decant stations 18b connected to the respective sequencing tower 14. Method 300, as illustrated in FIGS. 3A-3B, is provided for sequencing and balancing flows of objects (e.g. vendor cases 28, inbound items, etc.) and containers (e.g. shipping containers 24, inventory/pick totes or receptacles 26, etc.) from the sequencing tower 14 with flows of containers (e.g. donor totes 34) from the ASRS 16. Method 400, as illustrated in FIGS. 4A-4B, is provided for sequencing and optimizing flows of inbound items (e.g. vendor cases 28) with flows of inventory containers (e.g. donor totes 34) arriving at a decant workstation 18b. Method 500, as illustrated in FIGS. 5A-5B, is provided for directing and optimizing the distribution of multiple of the same type of item, such as items having the same SKU, to various different locations within an automated warehouse facility (e.g. different ASRS aisles, for example). Method 600, as illustrated in FIG. 6, is provided for directing and optimizing the distribution of different types of items that are typically ordered together to a similar location within an automated warehouse facility. Method 700, as illustrated in FIGS. 7A-7B, is provided for directing and optimizing the receipt and offloading of inbound trailers at an automated warehouse facility. Each method will be discussed in further detail below.

Referring to FIGS. 1-1C, the computer system 13 includes a program 48 that carries out a method 100 that includes various steps for determining the optimal use of resources in an order fulfillment facility, including determining what items need to be input into the ASRS 16 via decant operations, determining the optimal use of space within the sequencing tower 14 to reduce or eliminate starvation at downstream workstations (e.g. ensuring sufficient shipping cartons 24 and pick totes 26 are available in the tower 14 to support downstream pick stations 18a and ensuring sufficient vendor cases 28 and inbound items are available in the tower to support downstream decant stations 18b) as necessary to meet the current and pending demand for those resources, and determining decant rates for particular decant stations 18b based on production data for those decant stations 18b. The program 48 includes a work timing module 48a to determine a work timings number which is the rate of production for a particular pick station 18a within the system 10 (e.g. one order fulfilled per minute, two orders fulfilled per minute, etc.). The program 48 includes a sequencing tower storage optimization module 48b which forecasts future/pending workflows per workstation 18 to determine an optimal ratio of inbound items/vendor cases 28 vs. empty cartons 24/pick totes 26 that are stored or buffered in the sequencing tower 14 to meet the current decant and pick requirements in the system 10. The program includes a decant rate module 48c to determine the decant rate of each decant station 18b in the system 12, the decant rate is the rate of decanting for a particular decant station 18b within the system 10, e.g. one vendor case decanted per minute, two vendor cases decanted per minute, etc.

Method 100, under the operation of module 48a, includes the steps of assuming 102 a work timings number based on a database 50 of starting work timing numbers. The program then uses production data to calculate 104 a work timing number for each SKU in a pending order. Calculating 104 the work timing number is done continuously to provide real-time work timing numbers for each SKU, which are updated and stored in a calculated work timings number database 52.

Module 48b of program 48 inspects and calculates 106 the number of shipping containers that will be required over the next user defined time period (e.g. ten minutes, one hour, one day, one week, etc.) (FIG. 1A). A database or list 54 of pending orders are assigned to each pick station 18a, and the database 54 is used in the calculation 106 of required shipping containers and the calculated number of required shipping containers per pick station 18a is stored in a database 56. Continuing from FIG. 1A to FIG. 1B, module 48b calculates 108 a required number of containers, in the form of vendor cases 28, which need to be decanted at each decant station 18b over the next user defined time period and stores the calculated numbers in a database 58 for each decant station 18b. Module 48b utilizes the operator decant rate that is determined by module 48c and stored in a database 60 when calculating 106 the number of containers that need to be decanted (FIGS. 1A-1C). To determine the operator decant rate at each decant station 18b, module 48c assumes 110 a default or initial decant rate based on a database 62 of starting decant rates and calculates 112 the decant rate for each decant station 18b based on production data for that station 18b (FIG. 1C). Calculating 112 the decant rate is done continuously to provide real-time decant rates for each decant station 18b and the calculated decant rate is stored in the database 60 of calculated operator decant rates. After calculating 106 the required/pending shipping containers and calculating 108 the required/pending containers for decant, module 48b calculates 114 an optimal ratio of inbound items and vendor cases 28 vs. shipping cartons 24 and pick totes 26 to be stored in the sequencing tower 14 at a given user defined time period, such as instantaneously, a ten minute period, a one hour period, etc. (FIGS. 1A and 1B). The calculated ratio of order fulfilment resources (e.g. cartons 24, pick totes 26) vs. decant resources (e.g. vendor cases 28) for the sequencing tower is stored in a database 64 within the computer system 13 for controlling and optimizing upstream and downstream processes in the facility 12.

A database 66 may be provided that contains optimal configurations of workstations 18 within the system 10. The database 66 provides for how many pick stations 18a verses how many decant stations 18b are required for a particular sequencing system 10 to optimize inventory inputs with order-fulfilment outputs for that system 10. The database 66 may be controlled and updated by the computer system 13 and program 48, however, it may be advantageous to retrieve the database of optimal workstation configurations 66 from another subsystem or program, such as a program for determining the optimal positioning and utilization of a labor force. In some instances, all workstations 18 may not be required to be in operation at a given time, as provided by the optimal workstation configurations provided by database 66.

Thus, method 100 determines the optimal ratio of inbound items to be input into the ASRS 16 as compared to shipping containers or pick totes for order fulfilment that are to be buffered in the sequencing tower 14 to ensure that downstream pick stations 18a and downstream decant stations 18b are not starved of work. Method 100 facilitates operation of the system 10 such that the system 10 is performing at an optimal production level based on the required order fulfillment requirements. Typically, method 100 is integrated with methods 200, 300, 400, 500, 600, and/or 700 to increase efficiency and throughput within the facility 12. However, it will be appreciated that method 100 may be performed independently in some instances.

Referring to FIGS. 2-2I, the computer system 13 includes a program 68 that carries out method 200, which is similar in many respects to method 100 described above, and which is also provided for optimizing sub-processes within an order fulfillment facility, including determining order configurations (e.g. multi-item orders, single-item orders, order requiring shipping containers 24, and orders requiring bags, etc.), assigning orders to a sequencing system 10 and its respective sequencing tower 14, assigning orders to pick stations 18a connected to the respective sequencing tower 14, assigning inbound items and vendor cases 28 to a system 10 and its respective sequencing tower 14, and/or assigning inbound items and vendor cases 28 to decant stations 18b connected to the respective sequencing tower 14. The program 68 includes a module 68a that determines an appropriate configuration for packing and shipping each of the orders in the pending order list database 54 (FIG. 2A). For example, a pending order that includes multiple items or SKUs will require a shipping carton 24 in the form of a box or other rigid container type, a pending order for a single item may require a shipping bag, or a pending order for a single item may require a shipping carton 24, such configurations are determined by module 68a. The program 68 also includes a slotting optimization module 68b which forecasts future/pending workflows in the system 10 to determine the optimal destination for vendor cases 28, shipping cartons 24, and pick totes 26 to be delivered to the required pick station 18a, decant station 18b, or particular aisle in the ASRS 16. Determining the optimal destination for an article is referred to as slotting, wherein the article destination is forecasted in a manner that chooses the destination of the article for optimal efficiency for future order-fulfilment processes.

Method 200, as carried out by program 68, includes a module 68a for determining work timings for pending orders and preparing a list of pending orders that is categorized by the configuration of the order (FIG. 2A). The module 68a assumes 202 a default work rate timing number based on a database 50 of initial or starting work timing numbers. The program 68 then uses production data to calculate 204 a work timing number for each pending order. Calculating 204 the work timing number may be carried out continuously to provide real-time work timing numbers for each order. The module 68a splits 206 each pending order into lists based on the shipment configuration required for that order, possible shipping configurations include multi-unit orders to be packed and shipped in shipping cartons 24, single unit orders to be packed and shipped in shipping cartons 24, and single unit orders to be packed and shipped in bags, known as poly bags. Multiple items for single unit items may be batched into a pick tote 26 such that the batch of single item orders may be transported to a downstream bagging subsystem which can efficiently handle the bagging process for the single item orders. The module 68a then sorts 208 each of the pending orders based on their priority within the respective configuration categories to prepare a database 70 of pending orders based on shipment configuration and priority.

Figure 2B:
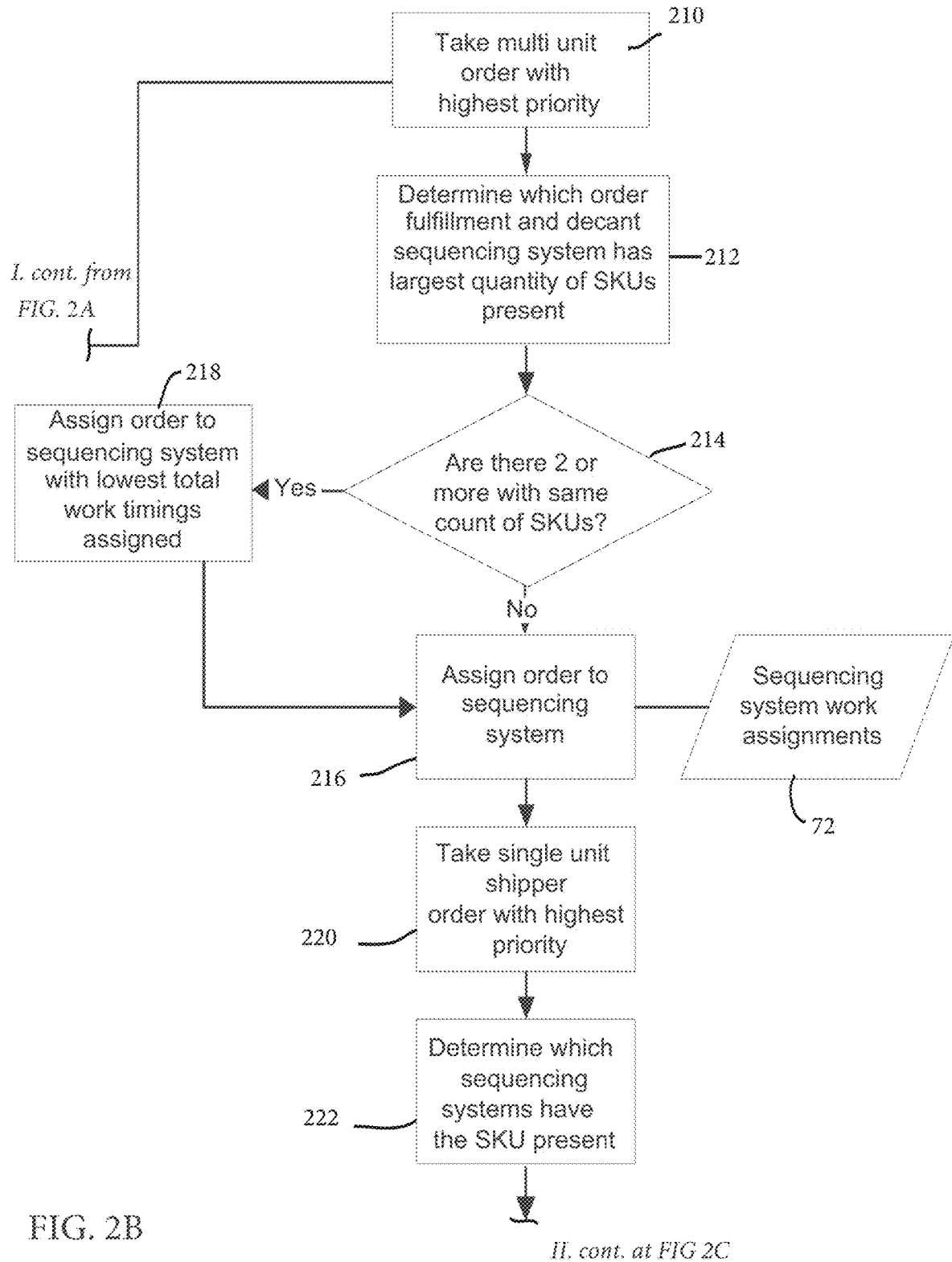

Continuing from FIG. 2A to FIG. 2B, using the pending order list in database 70, the method 200 includes choosing 210 the multi-unit configuration order with the highest priority from the database 70 (FIG. 2B). Then determining 212 which sequencing system 10 and respective sequencing tower 14 and ASRS 16 aisles have the greatest number of SKUs present that are required to fulfil that multi-unit order. The method determines 214 if there are more than one sequencing system 10 in the facility 12 that contains the same number of required SKUs. If not, or in other words one system 10 has more available SKUs to fulfil the order than any other system 10 in the facility, then the program assigns 216 the order to that system 10 with the highest available SKUs. If yes, more than one system 10 contains an equal number of SKUs to fulfil the order, then the program assigns 218 the order to the sequencing system 10 that has the lowest number of work timings assigned to it (i.e. the sequencing system 10 with the least amount of pending work is chosen). Once the assignments 216 and 218 are made, the multi-unit order assignments are stored in a sequencing system assignment database 72. Either concurrently with or subsequent to the multi-unit operations of steps 210-218, the program 68 then selects 220 the highest priority order from the single unit requiring a shipping container configuration from database 70 and determines 222 which sequencing systems 10 contain the SKU required to fulfil that single unit order (FIG. 2B). Continuing from FIG. 2B to FIG. 2C, the method then determines 224 if there are more than one sequencing system 10 that contains the required SKU for the single unit order. If not, or in other words only one system 10 includes the required SKU, the program assigns 226 the single unit order to that system 10 containing the required SKU. If yes, more than one system contains the required SKU, the program assigns 228 the single unit carton order to the sequencing system 10 having the lowest total shipping cartons and pick totes assigned to it (i.e. the sequencing system 10 with the greatest remaining storage/buffer capacity). Once the assignments 226 and 228 are made, the single unit requiring shipping cartons assignments are stored in the sequencing system assignment database 72.

Figure 2C:
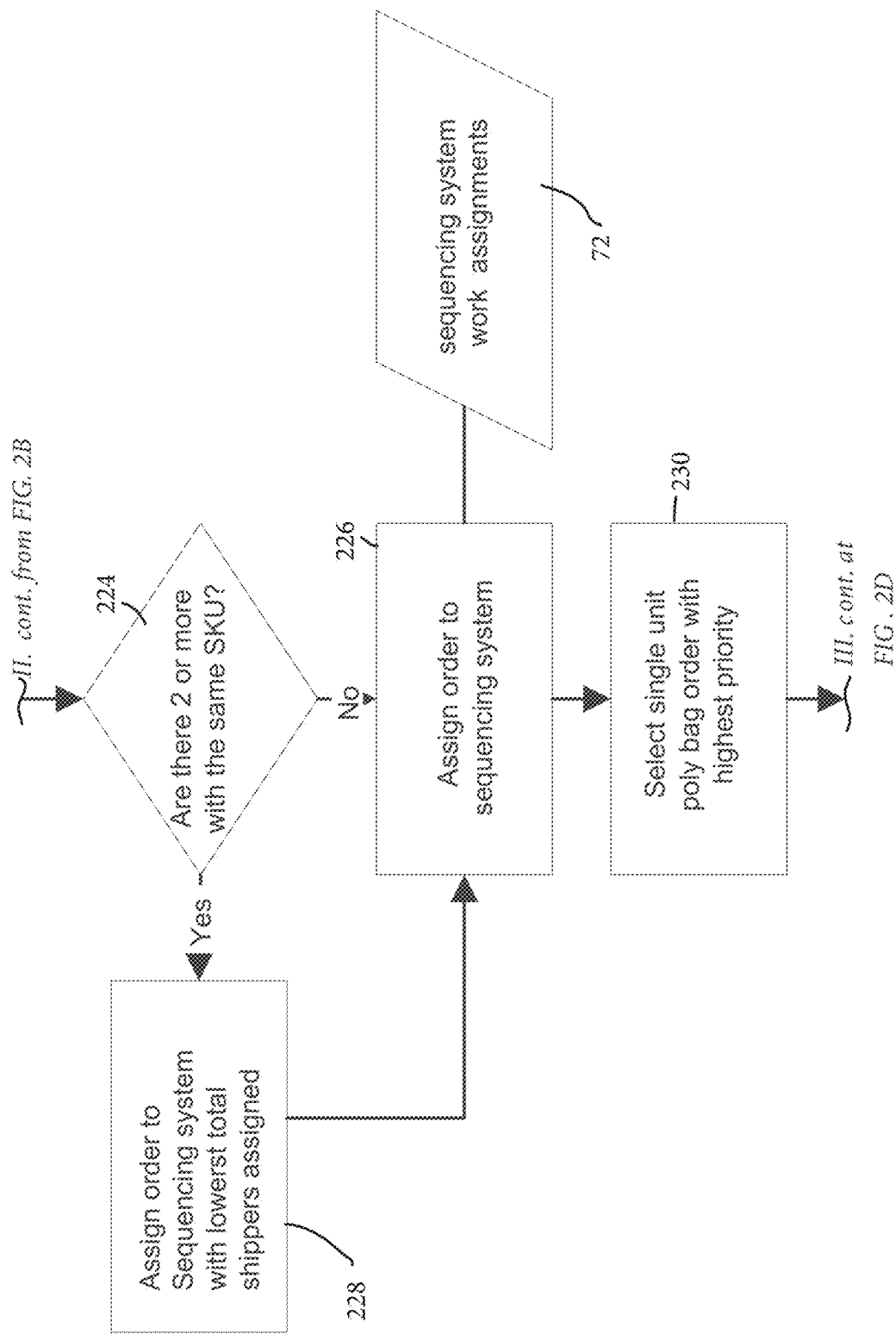
Figure 2D:
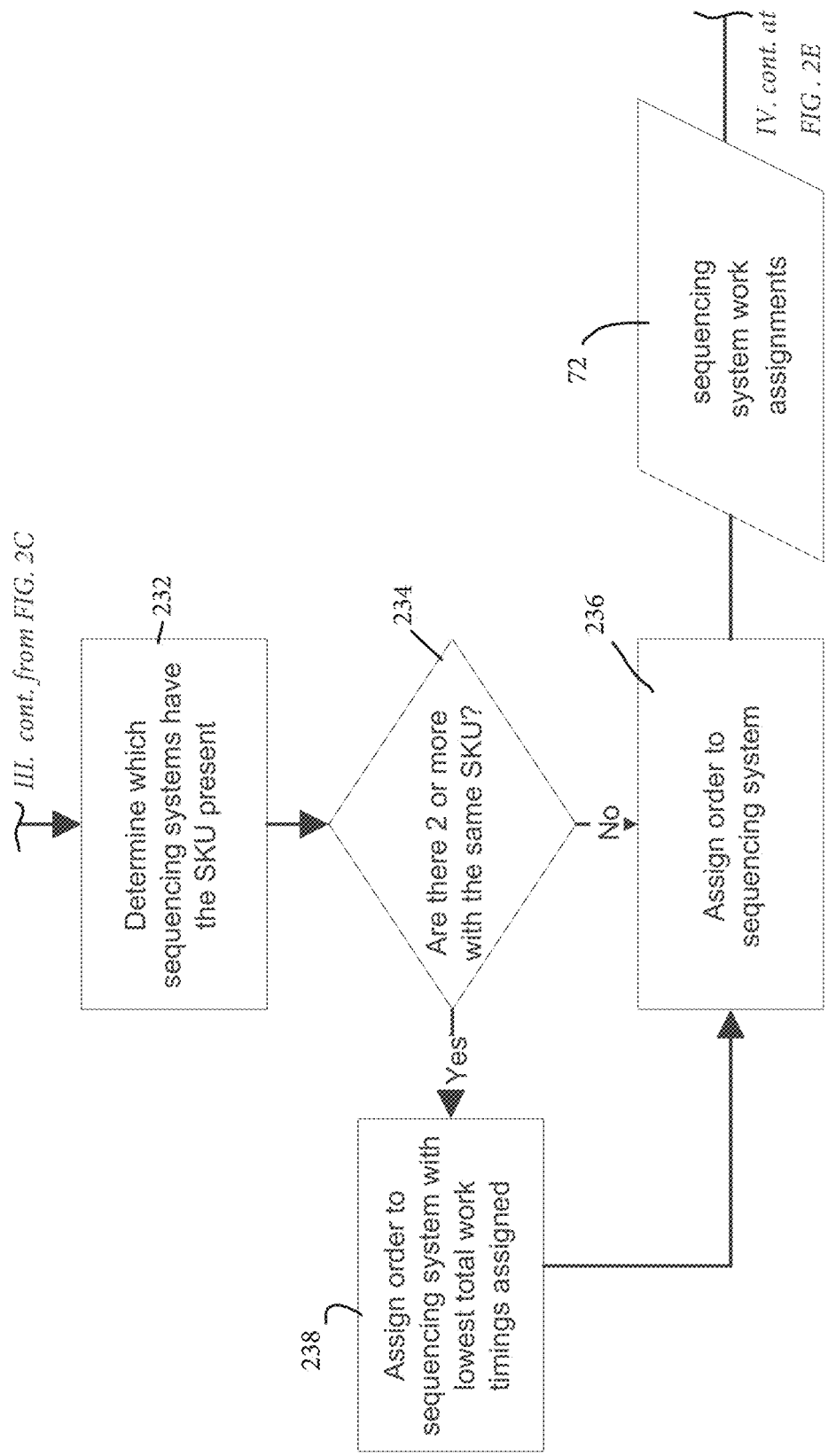

Either concurrently with or subsequent to the multi-unit operations of steps 210-218 and the single-unit requiring shipping carton operations of steps 220-228, the program 68 then selects 230 the highest priority order from the single unit requiring a bag configuration from database 70 and determines 232 which sequencing systems 10 contain the SKU required to fulfil that single unit bag order (FIGS. 2C and 2D). The method then determines 234 if there are more than one sequencing systems 10 that contain the required SKU for the single unit bag order. If not, or in other words only one system 10 includes the required SKU, the program assigns 236 the single unit bag order to that system 10 containing the required SKU (FIG. 2D). If yes, more than one system contains the required SKU, the program assigns 238 the single unit order to the sequencing system 10 that has the lowest number of work timings assigned to it (i.e. the sequencing system 10 having the SKU and with the least amount of pending work is chosen). Once the assignments 236 and 238 are made, the single unit orders requiring bags assignments are stored in the sequencing system assignment database 72.

Figure 2E:
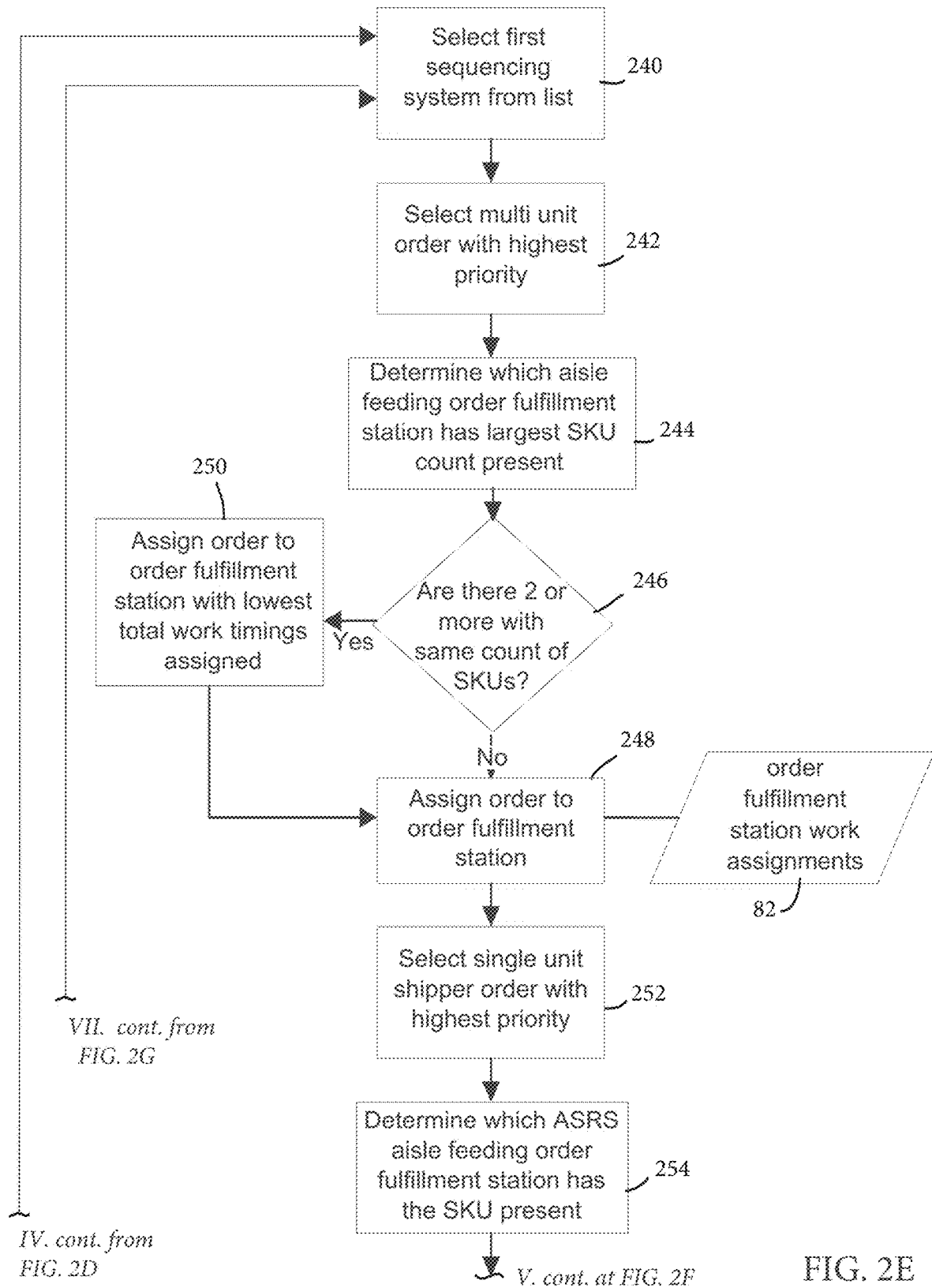

Continuing from FIG. 2D to FIG. 2E, the method 200 carried out by program 68, either concurrent with or subsequent to steps 202-238, selects 240 a first sequencing system 10 that is active in the facility 12 from database 72 and then selects 242 the multi-unit order with the highest priority that is assigned to the selected sequencing system 10 and determines 244 which aisle of the ASRS 16 corresponding to the selected system 10 contains the largest number of required SKUs to fulfil the selected multi-unit order. The program then determines 244 if there are two or more aisles of the ASRS that contain an equally high number of required SKUs to fulfil the order. If not, or in other words only one aisle contains a highest number of required SKUs, then the program assigns 248 the selected multi-unit order to the pick station 18a that corresponds to the aisle of the ASRS 16 with the highest number of required SKUs. If yes, more than one aisle contains an equally high number of required SKUs, the program assigns 250 the selected multi-unit order to the pick station 18a that has the lowest number of work timings assigned to it (i.e. the pick station 18a with the least amount of pending work is chosen). For example, in a system 10 that is in direct communication with four ASRS aisles and the system 10 includes two pick stations 18a each in direct communication with only two of those four ASRS aisles, if one of the four aisles contains two SKUs required for the selected multi-unit order and each of the other four aisles contain only one SKU required for that order, the program assigns 248 the selected multi-unit order to the pick station 18a that corresponds to the ASRS aisle that contains the two required SKUs. For another example, in a system 10 that is in direct communication with four ASRS aisles and the system 10 includes two pick stations 18a each in direct communication with only two of those four ASRS aisles, if a multi-unit order requires four SKUs and one of the two aisles corresponding to the first pick station 18a contains two of the required SKUs and one of the two aisles corresponding to the second pick station 18a contains two of the required SKUs, the program assigns 250 the selected multi-unit order to the pick station 18a having the lowest amount of pending work. Once the assignments 248 and 250 are made, the multi-unit order assignments per pick station 18a are stored in a pick station assignment database 82.

Either concurrently with or subsequent to the multi-unit operations of steps 242-250, the program 68 selects 252 the single unit order requiring a shipping carton with the highest priority that is assigned to the selected sequencing system 10 and determines 254 which aisle of the ASRS 16 corresponding to the selected system 10 contains the required SKU to fulfil the selected single unit carton order (FIG. 2E). Continuing from FIG. 2E to FIG. 2F, the program then determines 256 if there are two or more aisles of the ASRS 16 corresponding to the selected system 10 that contain the required SKU to fulfil the single unit carton order. If not, or in other words if only one aisle contains the required SKU, then the program assigns 258 the selected single unit carton order to the pick station 18a that corresponds to the aisle of the ASRS 16 with the required SKU. If yes, more than one aisle contains the required SKU, the program assigns 260 the selected single unit carton order to the pick station 18a having the lowest total shipping cartons and pick totes operations assigned to it (i.e. the pick station 18a with the greatest remaining capacity for shipping container fulfilment operations). For example, in a system 10 that is in direct communication with four ASRS aisles and the system 10 includes two pick stations 18a each in direct communication with only two of those four ASRS aisles, if only one of the four aisles contains the SKU required for the selected single unit carton order, the program assigns 258 the selected order to the pick station 18a that corresponds to the ASRS aisle that contains the required SKU. For another example, for a single unit carton order in a system 10 that is in direct communication with four ASRS aisles and the system 10 includes two pick stations 18a each in direct communication with only two of those four ASRS aisles, if one of the two aisles corresponding to the first pick station 18a contains the required SKU and one of the two aisles corresponding to the second pick station 18a contains the required SKU, the program assigns 260 the selected single unit carton order to the pick station 18a having the lowest number of pending shipping carton operations. Once the assignments 258 and 260 are made, the single unit carton order assignments per pick station 18a are stored in the pick station assignment database 82.

Figure 2F:
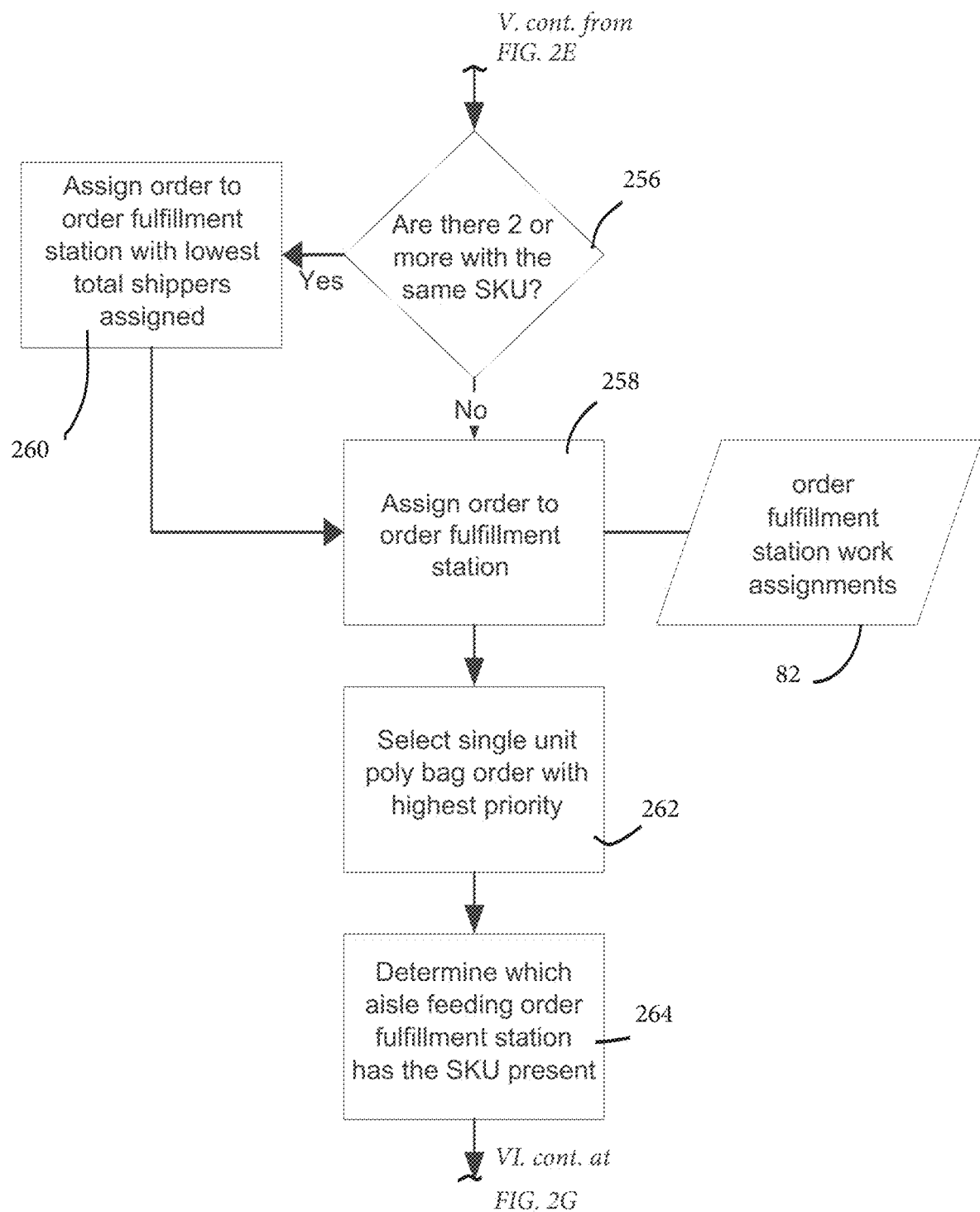

Either concurrently with or subsequent to the multi-unit operations of steps 242-250 and the single-unit requiring shipping carton operations of steps 252-260, the program 68 then selects 262 the single unit order requiring a bag with the highest priority that is assigned to the selected sequencing system 10 and determines 264 which aisle of the ASRS 16 corresponding to the selected system 10 contains the required SKU to fulfil the selected single unit bag order (FIG. 2F). Continuing from FIG. 2F to FIG. 2G, the program then determines 266 if there are two or more aisles of the ASRS 16 corresponding to the selected system 10 that contain the required SKU to fulfil the single unit bag order. If not, or in other words if only one aisle contains the required SKU, then the program assigns 268 the selected single unit bag order to the pick station 18a that corresponds to the aisle of the ASRS 16 with the required SKU. If yes, more than one aisle contains the required SKU, the program assigns 270 the selected single unit bag order to the pick station 18a that has the lowest number of work timings assigned to it (i.e. the pick station 18a with the least amount of pending work is chosen). For example, in a system 10 that is in direct communication with four ASRS aisles and the system 10 includes two pick stations 18a each in direct communication with only two of those four ASRS aisles, if only one of the four aisles contains the SKU required for the selected single unit bag order, the program assigns 268 the selected order to the pick station 18a that corresponds to the ASRS aisle that contains the required SKU. For another example, for a single unit bag order in a system 10 that is in direct communication with four ASRS aisles and the system 10 includes two pick stations 18a each in direct communication with only two of those four ASRS aisles, if one of the two aisles corresponding to the first pick station 18a contains the required SKU and one of the two aisles corresponding to the second pick station 18a contains the required SKU, the program assigns 270 the selected single unit bag order to the pick station 18a having the lowest amount of pending work. Once the assignments 268 and 270 are made, the single unit bag order assignments per pick station 18a are stored in the pick station assignment database 82. The method steps 210-240 and 242-270 are continuously carried out, by the computer system 13 and program 68, for each pending order, each of the sequencing systems 10 in the facility 12, and each of the pick stations 18a within the sequencing systems 10. By continuously operating, the method 200 provides optimized and updated, real-time sequencing for the sequencing systems 10 to most efficiently fulfil the pending orders based on historical and/or current production rates of the pick stations 18a in the facility 12. Thus reducing or eliminating starvation (i.e. lack of work) at all pick stations 18a when there are orders to be fulfilled in the facility 12.

Figure 2G:
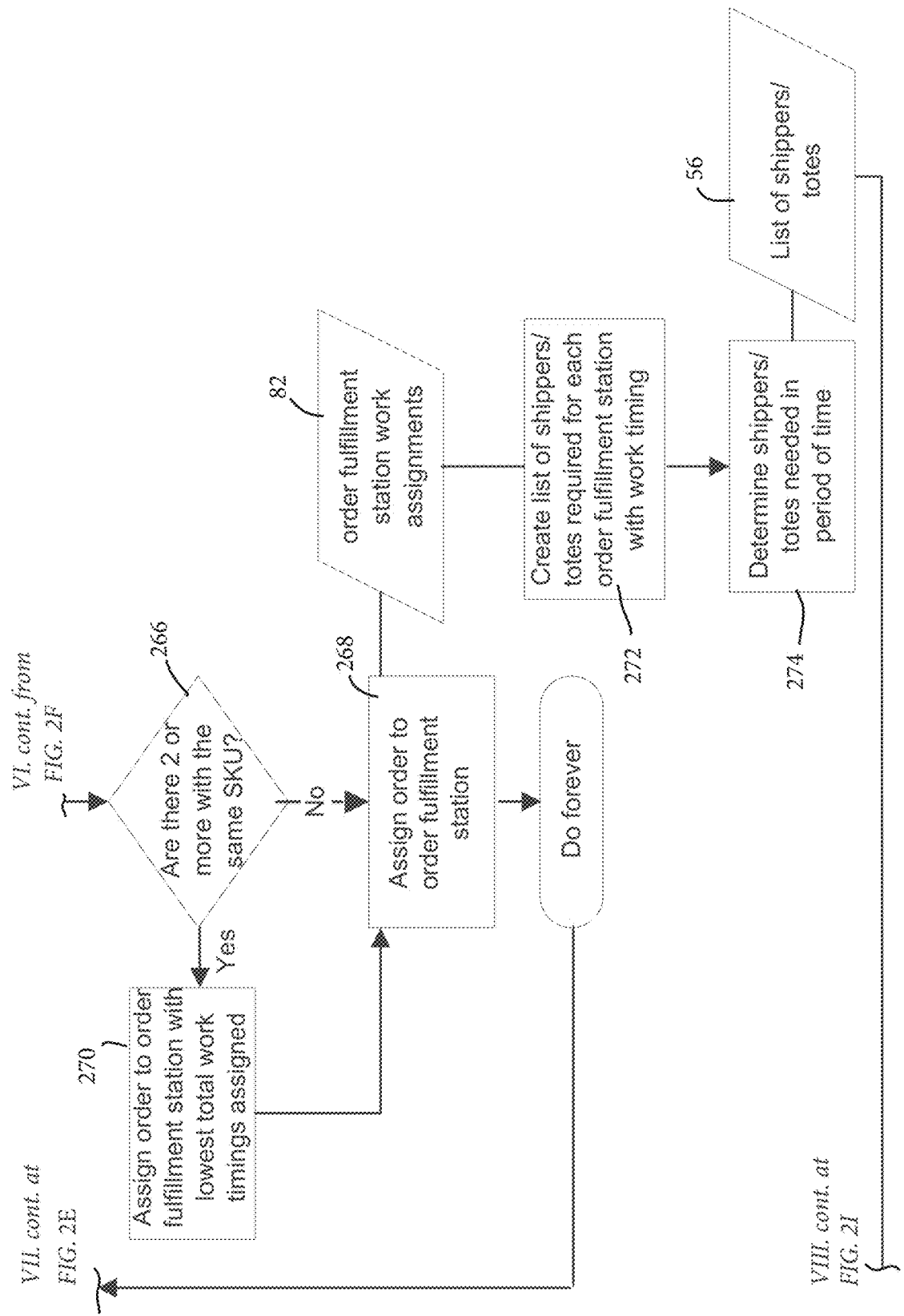

Based on the pick station work assignments, program 68 creates 272 a listing of the shipping cartons 24 and empty pick totes 26 that are required for the pending work assignments of each pick station 18a (FIG. 2G). The program determines 274 the required cartons 24 and totes 26 that are required, based on a user defined period of time, to ensure that the required number of cartons and totes are buffered in the sequencing tower 14 so that the cartons and totes are available when required at the pick station 18a. The list of required cartons 24 and totes 26 are stored in a database 56, which may be accessed by various subsystems, such as a carton erector subsystem.

Figure 2H:
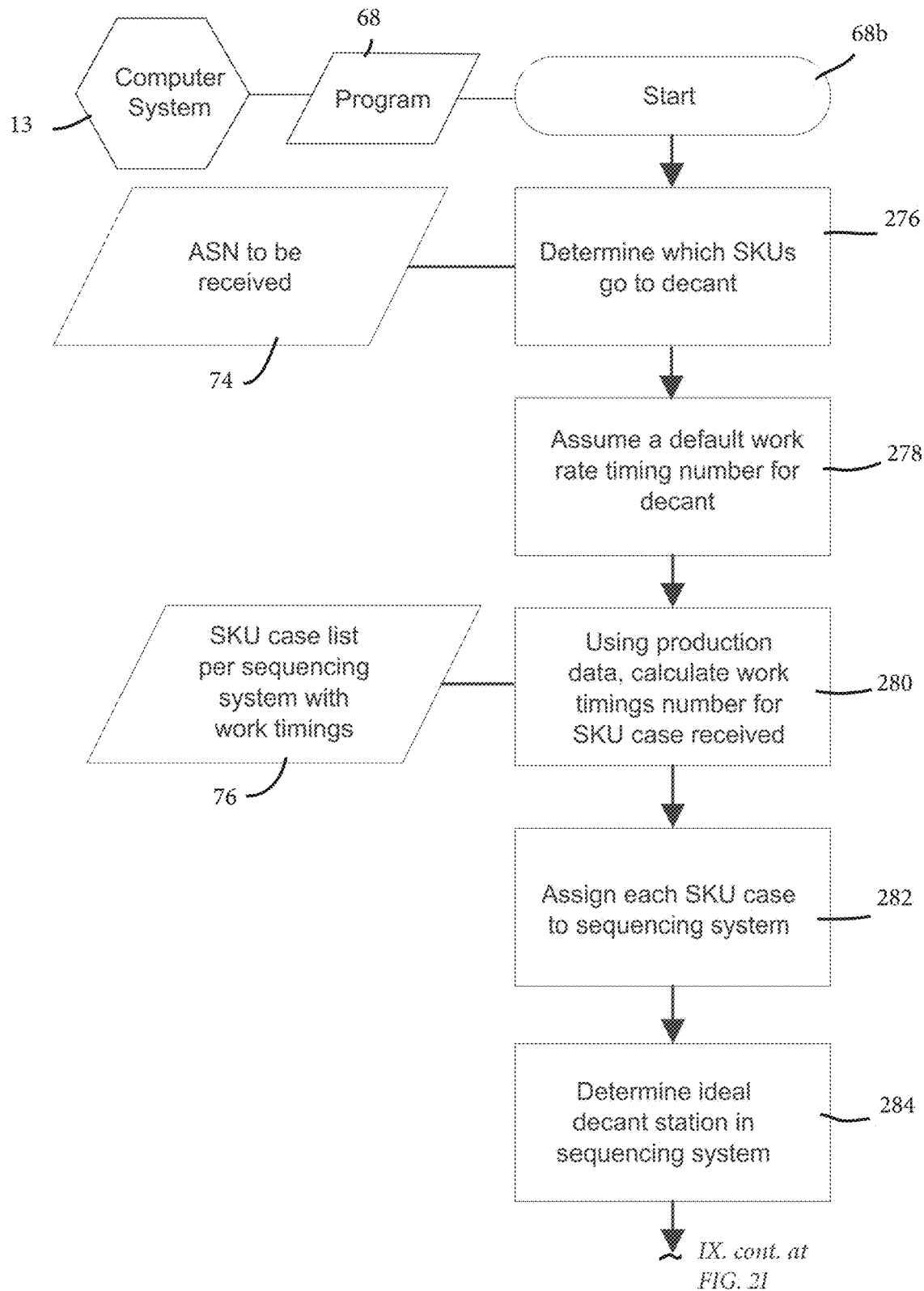
Figure 2I:
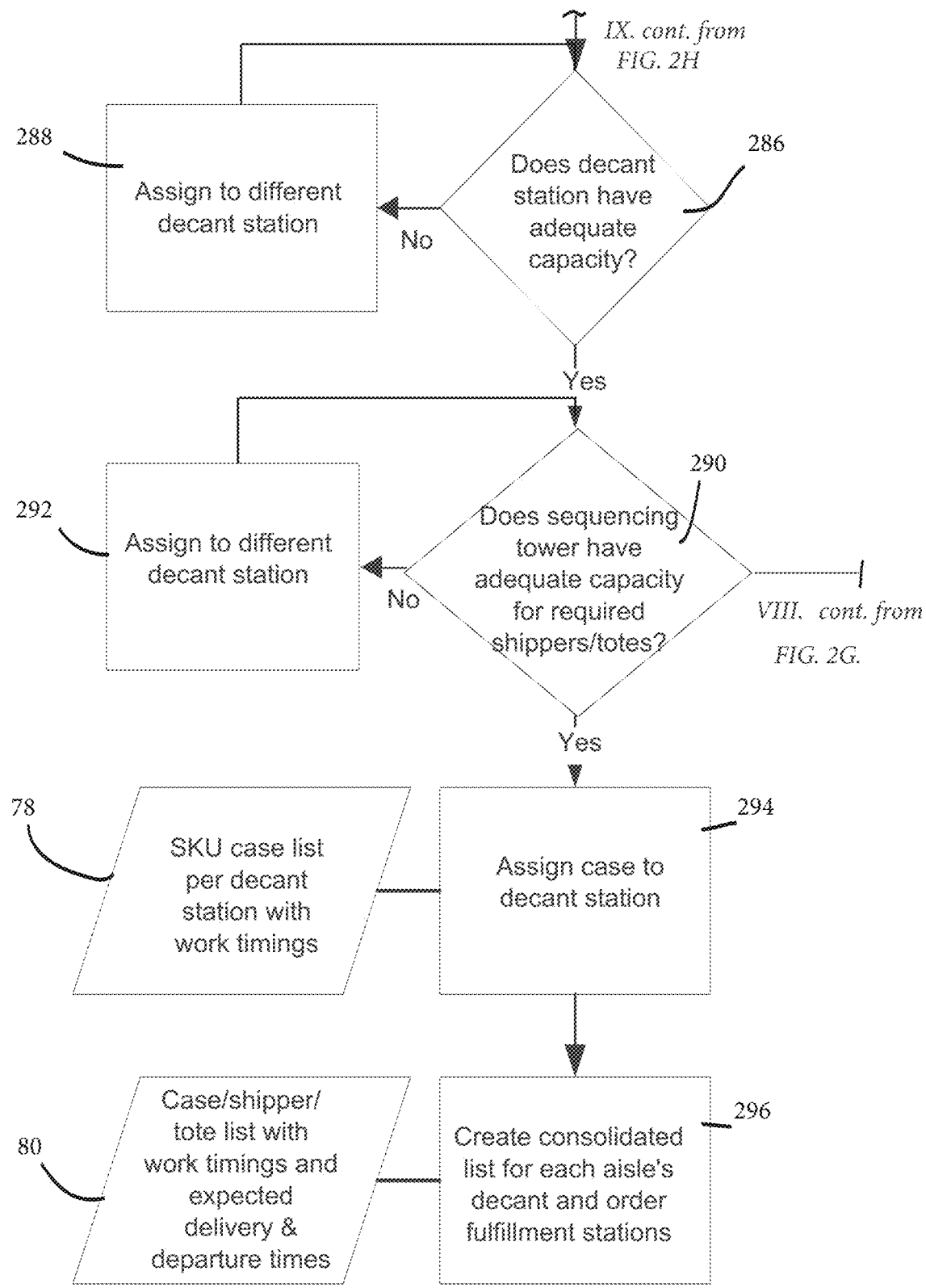

Referring to FIGS. 2H-2I, the program 68 includes a module 68b to carry out a portion of method 200. Module 68b is provided for optimally assigning or slotting inbound items to sequencing systems 10, decant stations 18b, and aisles of the ASRS 16 and for creating a consolidated list 80 of work timings, expected order delivery times, and expected order departure times for all inbound items (vendor cases 28), empty shipping cartons 24, and empty pick totes 26 in the facility. Module 68b carries out the steps of determining 276 which inbound items require decanting operations. Each unique item, either inbound or already in the system is referred to by a unique stock keeping unit (SKU) identifier and the inbound SKUs are stored in a database 74 of automated shipping notices provided with the inbound items. Vendor cases 28 (also referred to herein as SKU cases) containing multiple items may need to be decanted and separated to be distributed throughout various locations in the facility. Some inbound SKUs may not require decant operation, such as large items, vendor cases that comprise only a single unit, and vendor cases with bulk packaging that is intended to remain in the bulk form for delivery to the end customer, for example. Once the SKUs requiring decanting are determined at 276, the program 68 assumes 278 a default work rate timing number, such as from a starting work timings database 50. Then, using production data of the workstations 18 in the facility 12, calculating 280 a work timing number for each SKU that is received that requires decant. The calculated work timing number per SKU is stored in a received SKU database 76. Each received vendor case is then assigned 282 to a sequencing system 10 within the facility 12 based on a most efficient slotting determination, such as discussed in more detail below with regard to methods 500 and 600. Once assigned to a sequencing system 10, the program 68 determines 284 an ideal decant station 18b within the system 10 to handle the vendor case (FIG. 2H). Continuing from FIG. 2H to FIG. 2I, the program 68 determines 286 if the chosen ideal decant station 18b has capacity to handle the vendor case. If no, the program 68 re-assigns 288 the vendor case to a different decant station 18b. The different decant station 18b may be chosen as the next most ideal decant station 18b and/or the closest decant station 18b with sufficient work capacity to handle the vendor case. If the program determines 286 that, yes, there is enough work capacity in the selected decant station 18b, the program 68 then determines 290 if the sequencing tower 14 connected to the selected decant station 18b has sufficient capacity for shipping containers 24 and pick totes 26 as required for the order fulfilment operations associated with the SKUs of the inbound vendor case. Program 68 accesses the database 56 of required shipping cartons 24 and pick totes 26 for the pick stations 18a in the selected sequencing system (see FIGS. 2F-2I). If no, the sequencing tower 14 associated with the selected decant station 18b does not have adequate capacity, the program 68 re-assigns 292 the vendor case to a different decant station 18b. As discussed above, the different decant station 18b may be chosen as the next most ideal decant station 18b and/or the closest decant station 18b with sufficient work capacity to handle the selected vendor case. If the program determines 290 that, yes, there is enough capacity in the sequencing tower 14 associated with the selected decant station 18b, the program 68 assigns 294 the selected vendor case to the selected decant station 18b. The program 68 creates 296 a consolidated database 80 of work timings, expected order delivery times, and expected order departure times for all inbound items (vendor cases 28), empty shipping cartons 24, and empty pick totes 26 in the facility 12. The database 80 is created 296 for the work assignments for each pick station 18a and each decant station 18b based on the aisles of the ASRS 16 that are in direct communication with those pick stations 18a and decant stations 18b. The database 80 is configured as a function of the items stored in or to be stored in a particular aisle in the ASRS 16.

Thus, method 200 balances ratios of various flows of articles in the facility 12, including the flows of shipping cartons vs. pick totes, single unit orders vs. multi-unit orders, bagged orders vs. shipping carton orders, vendor cases vs. shipping cartons/pick totes, and the flow of varying shipping carton sizes. Method 200 balances the multiple flows of articles to sustain operational throughput of multiple downstream order fulfillment functions sharing the same hardware, including upstream supplying resources (receiving subsystems, carton erector subsystems, etc.) and/or downstream order fulfillment resources (sequencing tower, ASRS, pick/decant workstations, etc.). The method provides for dynamic, real-time intermixing of inbound items (e.g. vendor cases) with order containers (e.g. empty shipping cartons and pick totes) to minimize starvation of any downstream function. The desired ratios of the various flows are determined as a function of user defined factors, such as whether a particular SKU is in high demand due to a holiday, or whether a retail store is running a promotion on a particular SKU, etc. business/customer decisions.

Balancing of single unit orders vs. multi-unit orders is particularly beneficial because, many single unit orders can outpace a sequencing tower and/or carton erector systems, thereby controlling the consumption rate of shipping cartons with the system 10. Balancing of bagged single unit orders vs. carton packaged single unit orders is particularly beneficial because items to be packed in bags are not typically handled by the pick operator 46, but are otherwise handled at a different location in the facility that is downstream of the pick station 18a. The pick operator 46 typically batches many items for single unit bag orders into one container (e.g. pick tote 26) to be sent to the bagging subsystem where each item will be individually bagged. The method 200 creates a steady flow of items to the bagging subsystem, which controls surges to the bagging subsystem.

Balancing the variance of shipping carton sizes is particularly beneficial because over-consumption of one size of container may overuse one carton erector while limiting the contribution of other carton erectors, which will decrease overall efficiency that may otherwise be realized using all carton erectors in a most efficient manner. The method 200 balances the orders to be picked in a manner that efficiently utilizes the carton erectors associated with the sequencing tower. For example, a carton erector subsystem may include three carton erector machines dedicated to a sequencing tower 14 in which each carton erector produces a different size shipping container. The method 200 ideally balances orders within the system 10 such that one-third of the shipping cartons required in the system 10 come from each of the carton erectors. Balancing shipping carton size thereby minimizes waste of cardboard and maximizes throughput.

Typically, method 200 is integrated with methods 100, 300, 400, 500, 600, and/or 700 to increase efficiency and throughput within the facility 12. However, it will be appreciated that method 200 may be performed independently in some instances.

Figure 3A:
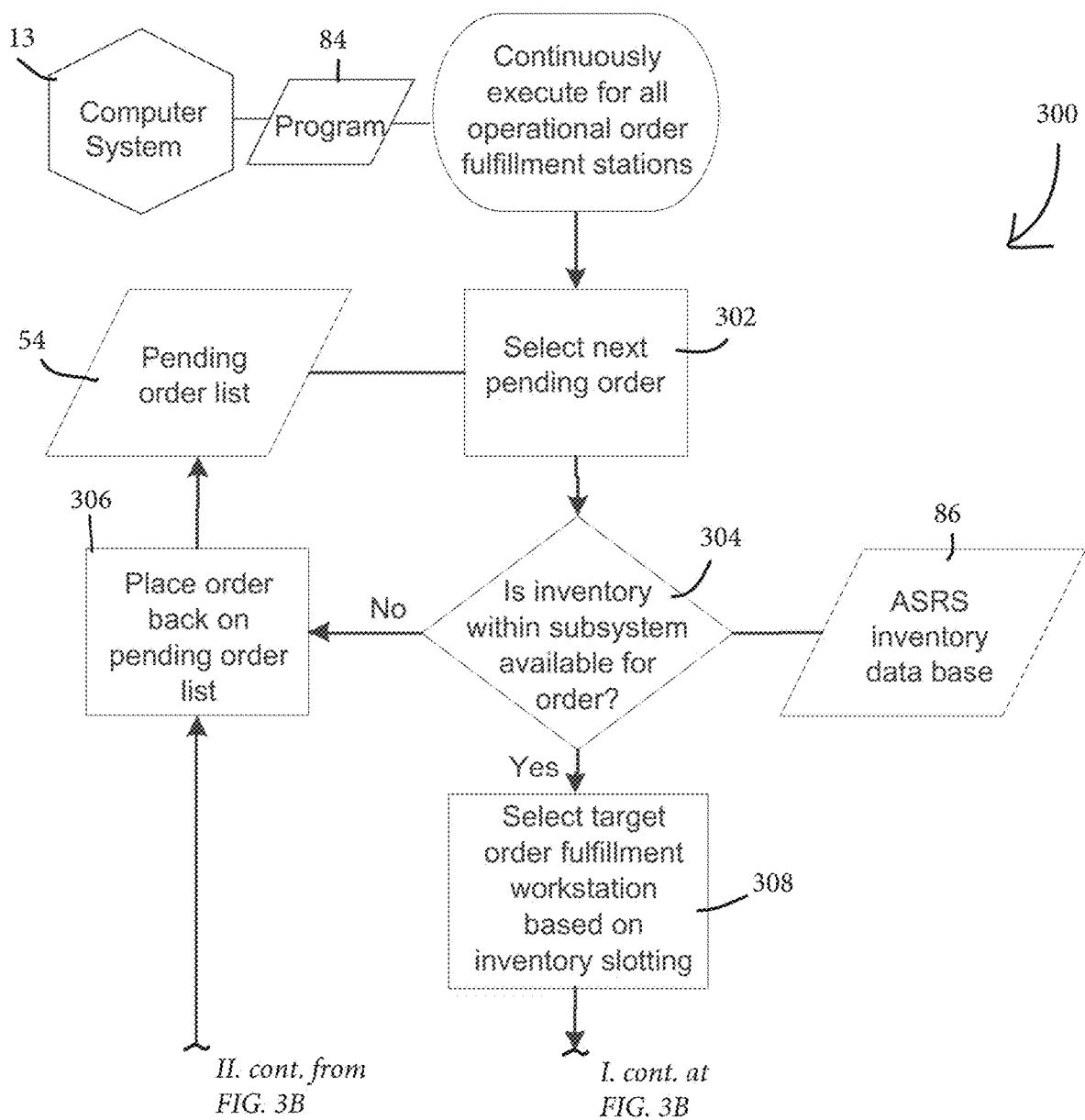
FIGS. 3A-3B are a diagram of a method for sequencing and optimizing a flow of inventory items with a flow of shipping containers arriving at a pick station in an automated warehouse facility, in accordance with the present invention.
Figure 3B:
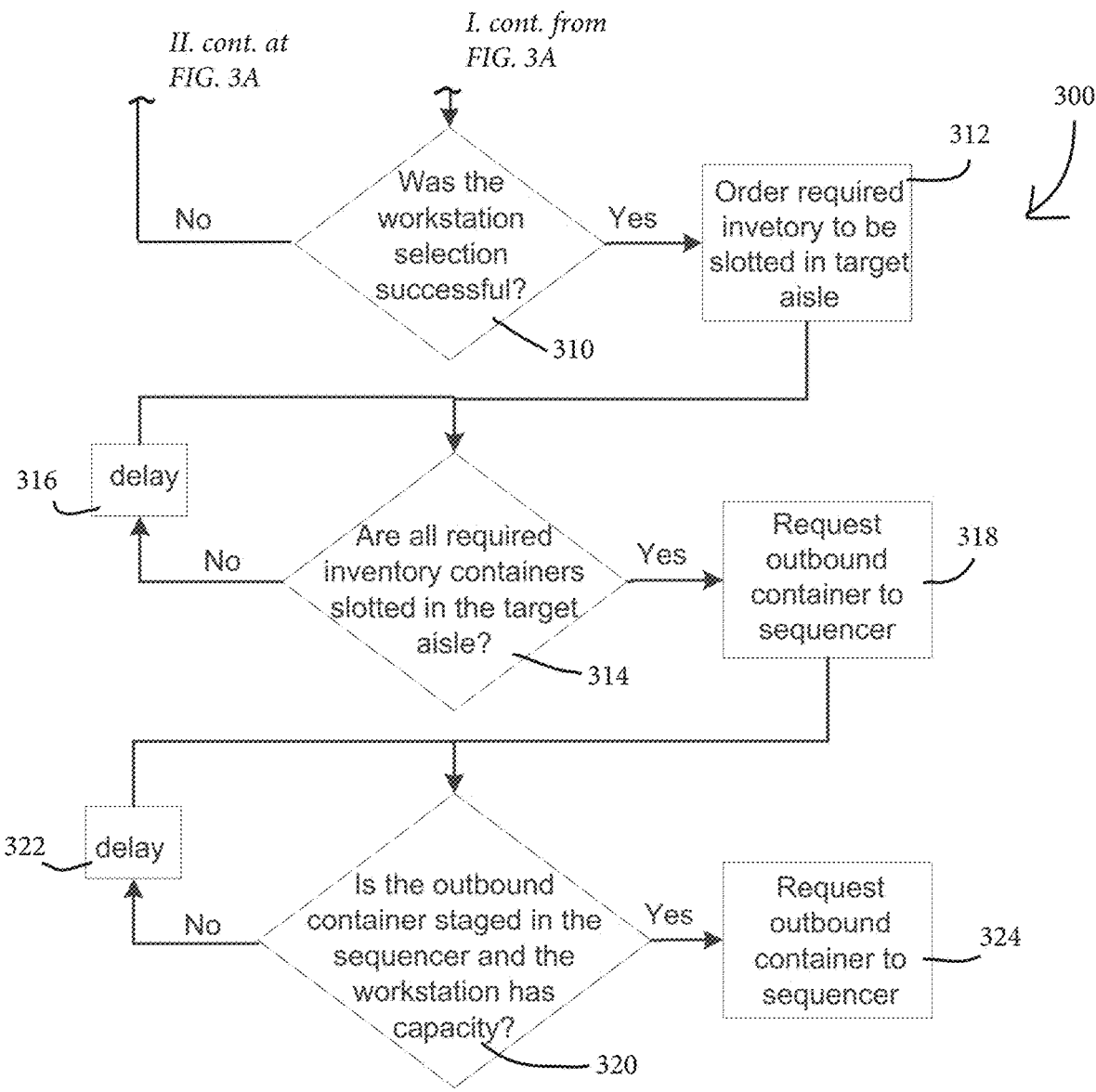

Referring to FIGS. 3A-3B, the computer system 13 includes a program 84 that carries out a method 300 provided for sequencing and balancing flows of objects to order-fulfillment/pick stations 18a in the facility 12. The method 300 sequences and balances flows of containers (e.g. shipping containers 24, inventory/pick totes or receptacles 26, etc.) from the sequencing tower 14 with flows of containers (e.g. donor totes 34) from the ASRS 16. The program 84 continuously executes to balance the flows at each pick station 18a in the facility 12. Method 300 includes selecting 302 the next order pending in the pending order database 54 and determining 304 if the inventory required for the pending order is available in the sequencing system 12 using a database 86 of items stored in the ASRS 16. If the required items are not available in the ASRS 16, the selected order is placed 306 back into the pending order database 54 and the program 84 selects 302 the next pending order. If the required items are available in the ASRS 16, the program 84 selects 308 a target or optimal pick station 18a to send the pending order to, for time and resource efficiency. For example, the pending order may be directed to a pick station 18a that is located adjacent to the aisle of the ASRS 16 that contains most or all of the inventory items required for the pending order.

Program 84 then determines 310 if the target pick station 18a is available to process the pending order. If the target pick station is not available to process the pending order, the program 84 places 306 the order back into the pending order database 54 and the program 84 selects 302 the next pending order. If the target pick station is available to process the pending order, the program 84 instructs 312 the system 10 to direct all inventory items, via donor totes 34, to be delivered to one of the aisles of the ASRS 16 that corresponds to the target pick station 18a. This may be accomplished via inter-aisle transfers from nearby aisles of the ASRS 16 that are connected to the target ASRS aisles via an inter-aisle transfer system, such as that described in U.S. Pat. No. 9,452,886, issued Sep. 27, 2016, which is hereby incorporated herein by reference in its entirety, or via a long-transfer as described above wherein a donor tote 34 with a required item is transferred from a distant ASRS aisle through the sorter 36 to the target ASRS aisle. The program 84 then determines 314 if all required donor totes 34 are present in the target ASRS aisles of the sequencing system 10. If all donor totes 34 are not available at the target aisles, the program 84 delays 316 further action until the donor totes 34 have arrived in the target ASRS aisles. If all donor totes are available at the target aisles, the program 84 orders 318 an appropriate shipping/staging container, such as a shipping carton 24 or pick tote 26 (such as from a carton erector 38), to be input into the sequencing tower 14.

The program then determines 320 if the required shipping carton 24 or tote 26 is staged in the sequencing tower 14. If the required shipping carton or pick tote is not staged in the sequencing tower 14, the program 84 delays 322 further action until the required shipping carton or pick tote is staged in the sequencing tower 14. If the required shipping carton or pick tote is staged in the sequencing tower 14, the program 84 orders 324 the ASRS 16 to release all of the required donor totes 34 to be delivered to the target pick station 18a and orders 326 the shipping carton 24 or pick tote 26 to be delivered to the target pick station 18a. The orders 324 and 326 are to be delivered to the pick station 18a substantially simultaneously such that the pick operator 46 can pick the items from the required donor totes 34 to the required shipping carton 24 or pick tote 26 with little or no delay or starvation. Upon arrival at the picking workstation 18a, the operator 46 is directed from which donor tote 34 to pick from, the quantity of items to pick from that tote 34, and the shipping/staging container to put the items to. Once picking is complete from a donor tote 34, that tote is returned to ASRS 16 for storage, and it is then available for future order fulfillment or decant operations. Once the order-fulfilment is complete for a shipping carton 24 or pick tote 26, that shipping/staging container is released to a downstream subsystem, as necessary for the next required process, such as being routed to a packing subsystem for automatic manifesting, sealing, weighing, and transportation rate pricing and labeling via a rate checking and labeling system. Once packing is complete, the order container departs from the packing subsystem to the shipping subsystem.

Typically, method 300 is integrated with methods 100, 200, 400, 500, 600, and/or 700 to increase efficiency and throughput within the facility 12. However, it will be appreciated that method 300 may be performed independently in some instances.

Referring to FIGS. 4A-4B, the computer system 13 includes a program 88 that executes a putaway logic algorithm that carries out a method 400 for decanting and assigning each item in an inbound container (e.g. vendor case 28) to an ASRS aisle and to the smallest cubed inventory container available or the smallest compartment in a container available that is of sufficient size to store the particular decanted item. The program 88 manages the assignment of inventory containers (i.e. donor totes 34) to the ASRS 16, inter-aisle transfers that occur within the aisles of the ASRS 16, and long distance transfers that occur external to the aisles (e.g. via the sorter 36). The program 88 controls the ASRS 16 such that it dispatches the donor totes 34 in sequence to arrive simultaneously with a corresponding inbound vendor case 28. Preferably, each donor tote 34 and/or compartment within the donor tote is SKU pure (i.e. includes only like items if it contains more than one item).

The program 88 and putaway logic are configured to simultaneously request inbound container(s) (e.g. vendor cases 28) from the sequencing tower 14 and the corresponding inventory container (e.g. donor tote 34) from the ASRS 16, with the donor tote 34 chosen based on whether it is efficiently sized for the item being decanted. In other words, the donor tote 34 is chosen from the ASRS 16 if it has a compartment available that is big enough but not exceedingly oversized relative to the item being decanted. Matching the inbound items to an efficiently sized available storage container/compartment optimizes the storage density within the facility 12. Underutilized storage density increases the required footprint of the facility. For example, it is inefficient to store an item requiring a compartment that is only one-eighth (⅛) of a donor tote 34 into a compartment that is one-half (½) of a donor tote. For another example, the program 88 and putaway logic can determine that it is an inefficient space usage to store three items of the same SKU into a compartment that is one-half (½) of a donor tote 34 and that it is a more efficient space usage to place each of the three items into individual compartments that are each one-eighth (⅛) of a donor tote 34 (i.e. 3*⅛=⅜<½). The individual compartments may be in the same tote 34, however the items may also be distributed over available compartments in multiple different totes 34, which increases the multiplicity of stored locations of multiples of the same SKU throughout the ASRS 16. The putaway logic increases storage utilization of each donor tote 34, increases storage density/utilization of the ASRS 16, and increases SKU storage multiplicity. The putaway logic preferably reduces aisle to aisle transfers (either inter-aisle or long transfer) of inventory containers and/or reduces the distance traveled by the container during a transfer. In other words, multiples of the same SKU distributed over more donor totes results in less moves/transfers and shorter distance moves needed to move items to the target aisles of the ASRS 16 when needed at a pick station 18a for an order-fulfilment. Once an inbound container is identified, the program 88 assigns the inbound container to an ASRS aisle based on current inventory distribution in the facility, historical SKU consumption, and inbound container accumulation availability.

The following is a detailed description of the steps of method 400 as illustrated in FIGS. 4A-4B. The program 88 selects the next inbound vendor case 28 from an inbound vendor case list database 76 and assigns 402 that vendor case to a decant station 18b via a corresponding sequencing tower 14. The assignment 402 is performed by the program 88 by utilizing a SKU slotting database 90 that contains recommended or optimal SKU slotting options based on pending orders and hardware utilization within the facility 12. The slotting options in the slotting database 90 may be created based on historical production and order data, user defined production and order data, and/or current production and order data, such as discussed in more detail below with regard to methods 500 and 600. The program 88 then determines 404 if there is capacity in the selected sequencing tower 14 to handle the decant operations for the select vendor case. If the tower 14 does not have capacity, the program recirculates or delays 406 the vendor case and assigns 402 the next vendor case to the decant station 18b. If it is determined 404 that the selected sequencing tower does have capacity, the program requests 408 an empty inventory tote 34 from the ASRS 16 to be transported to the decant station 18b. The program determines 410 if all items for the decant operation are staged in the sequencing tower 14, for example the program determines if all vendor cases necessary to fill the empty donor tote are present in the tower 14. If no, the program 88 delays 412 the operation and performs a different decant operation. If all items are present in the sequencing tower 14, the program releases 414 all required items from the tower 14 to the decant station 18b. Preferably, the requesting 408 and subsequent delivery of empty totes 34 to the pick stations is performed substantially simultaneous with the releasing 414 of items from the sequencing tower 14 such that the empty tote 34 and all decant items arrive at the decant station 18b together. The operator (human or robot) then decants 416 the required items into the donor tote 34, which is subsequently stored in the ASRS 16 once the decant operation is completed. The operator is directed from which vendor case to pick from (when multiple vendor cases are present at the decant station) and to which inventory tote or compartment of a tote to put the units to. Once the donor tote is stored in the ASRS 16, an inventory database 86 of items stored in the ASRS 16 is updated to reflect the current inventory.

Typically, method 400 is integrated with methods 100, 200, 300, 500, 600, and/or 700 to increase efficiency and throughput within the facility. However, it will be appreciated that method 400 may be performed independently in some instances.

Referring to FIGS. 5A-5B, the computer system 13 includes a program 92 that executes a putaway logic algorithm and carries out a method 500 for directing and optimizing the distribution of multiple of the same type of item, e.g. items having the same SKU (otherwise referred to as "SKU instances"), to various different locations within an automated warehouse facility, such as to different ASRS aisles, for example. The program 92 allocates SKU instances or quantities of a single SKU over multiple donor totes 34 such that various SKU instances may be dispersed throughout the facility 12. The program 92 can redirect totes 34 containing SKU instances of that SKU throughout the facility (e.g. to different locations or subsystems) based on forecasted consumption rates for that SKU. Doing so increases the number of SKU instances and donor totes 34 containing that SKU so that the SKU can be delivered to multiple workstations simultaneously, if necessary, and also decreases dependency on shared resources between the workstations. For decant operations, method 500 typically distributes the SKUs to empty containers/compartments of containers, however method 500 may be utilized to top off containers/compartments, otherwise referred to as inventory saturation wherein the volume of a donor tote is fully utilized.

The following is a detailed description of the steps of method 500 as illustrated in FIGS. 5A-5B. The program 92 inspects 502 the characteristics of each inbound SKU, such as those received in the receiving subsystem, to determine a target slotting area which is ideal for the size and/or demand for that SKU. The inspection 502 is done in comparison with a SKU master database 94 and the recommended target slotting area is stored in the recommended SKU slotting database. The target slotting area may be a storage location within the ASRS 16, or may be a different subsystem for special handling of certain SKUs. For example, a large item SKU, such as a bag of dog food or a set of golf clubs, may be directed to a manual decant subsystem as the hardware in the automatic sequencing system 10 may not be capable of handling that SKU. For each inbound SKU, the program forecasts 504 demand requirements for that SKU over a future user defined period (e.g. ten minutes, one hour, 24 hours, etc.) based on historical demand data for that SKU that is stored in a historical demand database 96. The forecasted demand requirements for each inbound SKU is stored in a forecasted demand database 98.

The program applies 506 the forecast demand requirements for each SKU along with user defined promotional input, which is provided by the user via a promotional input database 116, to create a forecast of demand for that SKU based on the promotional input which is stored in database 118. For example, a user may run a promotion on frozen turkeys during a holiday season and the user defined promotional data will be applied 506 by the program 92 to forecast demand for that turkey SKU during the duration of the promotion and/or user defined period. The program 92 calculates 508 the number of required SKU instances of that SKU over the user defined period based on the forecasted promotional demand 118 and production rates 52 for the pick stations 18a in the facility 12 (see exemplary discussion regarding calculation of work timings numbers 52 (e.g. production rates), as performed for method 100, described above). The number of required SKU instances for the SKU is stored in a database 122 and represents the number of SKU instances or copies of the SKU required to be distributed throughout the facility 12 to ensure that the forecasted demand will be met during the user-defined promotional period. Program 92 continuously performs method 500 to replenish the SKU as it is consumed or depleted, such that inventory of the SKU is ideally always available to meet the forecasted demand.

Typically, method 500 is integrated with methods 100, 200, 300, 400, 600, and/or 700 to increase efficiency and throughput within the facility 12. However, it will be appreciated that method 500 may be performed independently in some instances.

Referring to FIG. 6, the computer system 13 includes a program 124 that executes a putaway logic algorithm that carries out a method 600 for directing and optimizing the distribution of different types of items that are typically ordered together to a similar location within an automated warehouse facility. Method 600 utilizes historical patterns of consumer purchasing to create groupings or families of SKUs that are commonly ordered together. For example, families of SKUs that may be ordered together include hammers ordered with nails, toothbrushes ordered with toothpaste, etc. Program 124 utilizes historical SKU data from a database 96 to create 602 a database of SKU family groupings 126 that are determined based on patterns found in the historical SKU order data 96. The number of SKU instances 122 in the facility 12 is utilized by the program 124 along with the SKU family grouping 126 to create 604 a SKU slotting plan 128 to direct inbound SKUs based on required SKU instances and family grouping patterns. The SKU instances 122 may be provided via method 500 as discussed above, or via another process or user defined input. Typically, method 600 is integrated with methods 100, 200, 300, 400, 500, and/or 700 to increase efficiency and throughput within the facility 12. However, it will be appreciated that method 600 may be performed independently in some instances.

Referring to FIGS. 7A-7B, the computer system 13 includes a program 130 that carries out a method 700 for directing and optimizing the receipt and offloading of inbound delivery vehicles/trailers at an automated warehouse facility. As discussed herein, inbound or received trailers are also referred to as receipts. The program 130 sequences and assigns vehicles to appropriate facility doors in support of order fulfillment facility operations. The program 130 prioritizes unreceived inventory (i.e. inventory that has not yet entered the facility but is otherwise on-site) based on current order demand to optimize sequencing of vehicles and their assignment to appropriate facility doors for unloading inventory. The program 130 also prioritizes and sequences outbound vehicles via assignment to appropriate facility doors for loading and staging to facilitate future departures. For inbound items, method 700 optimizes receipt of inbound SKUs to replenish stocked-out or depleted SKUs within the facility 12. Such optimization is beneficial to decrease short orders which are unfilled due to lack of inventory. Method 700 improves efficiency of inventory planning which is particularly beneficial during peak inventory occurrences, such as during holiday seasons. For outbound items, method 700 optimizes the efficiency for staging vehicles, decreases door to door movements of vehicles caused by upstream errors, and increases the efficiency of the vehicle drivers by providing adequate time and space to operate clear of other vehicles. Method 700 prioritizes trailers based on the SKUs contained in the trailer and the demand for those SKUs within the facility and not based on the arrival order of the trailers. In other words, trailers with unneeded SKUs are not brought into a door based on whether they arrived at the facility first, but instead based on which on-site trailer has the highest quantity of required SKUs or the highest priority SKU required in the facility 12. Method 700 may also be utilized to direct trailers between various buildings that makeup a single inter-connected facility 12 and can also be utilized to operate multiple facilities that are physically or operationally disconnected from one another.

The following is a detailed description of the steps of method 700 as illustrated in FIGS. 7A and 7B. The program 130 utilizes historical SKU order information 96 to forecast 702 demand for a SKU within the facility 12 over a future user defined period of time, in similar manner to that described above under step 504 of method 500. The user defined period of time may be chosen by a user as desired, such as over the next one hour period, over the next twenty-four hour period, over an entire promotional period, over a seasonal shopping period, etc., for example. The forecasted SKU demand is saved in a database 98. Similar to that described above under step 506 of method 500, program 130 applies 704 the forecast demand requirements for each SKU along with user defined promotional input from database 116 to create a forecast of demand for each SKU based on the promotional input which is then stored in database 118. Utilizing the current demand or pending orders list 54, a calculated greater SKU demand database 138 is created by contrasting 706 the forecasted demand 118 for a SKU versus the current demand from the pending orders list 54, with the greater of these numbers representing the calculated greater SKU demand. The program then contrasts the calculated greater SKU demand with the inventory within the facility in database 140 to create 708 a short fall list 142. The inventory as stored in database 140 may be the same as the inventory in the ASRS 16, as represented in database 86, however it may also include additional inventory within the facility 12 that is outside the ASRS 16, such as in a manual decant subsystem, in a sequencing tower 14, at a receiving subsystem, etc. The short fall list 142 represents SKUs that require replenishment to meet SKU demand within the facility and the short fall list 142 is then used to re-sequence the trailers to meet the demand as efficiently as possible based on the SKUs available on on-site trailers.

The program 130 then contrasts the short fall list 142 with the SKUs on the pending trailers 144 which are currently on-site at the facility 12 to create 710 a listing 146 of trailers on site that contain the short fall SKUs. The SKUs on the pending trailers 144 are known via an automated shipping notice (ASN), e.g. an electronic bill of lading. Based on the pending trailers 144 and the listing of trailers containing the short fall SKUs 146, the program 130 re-sequences 712 receipts/trailers on the pending list 144, if they are moveable, to prioritize the trailers that contain the SKUs on the short fall list. A trailer may not be moveable in some situations, such as if it is already at a receiving door or is otherwise incapacitated. The re-sequenced receipts/trailers listing may be stored in a different database 148 or may be incorporated into database 144 such that method 700 continuously optimizes the flow of inbound trailers. Thus, method 700 re-sequences on-site trailers based on their contents in order to meet inventory short falls within the facility 12.

Typically, method 700 is integrated with methods 100, 200, 300, 400, 500, and/or 600 to increase efficiency and throughput within the facility 12. However, it will be appreciated that method 700 may be performed independently in some instances.

As described herein, the disclosures of the above mentioned systems and methods disclosed in commonly assigned patent applications U.S. patent application Ser. No. 16/575,803, filed Sep. 19, 2019, by Michael Khodl and Tim Post for a METHOD AND APPARATUS FOR CONTROLLING FLOW OF OBJECTS IN A MATERIAL HANDLING SYSTEM, Ser. No. 16/829,134, filed Mar. 25, 2020, by Crystal Parrott and Kevin Heath for a PICKING STATION WITH RETURN PROCESSING, and U.S. Pat. No. 7,086,519, issued Aug. 8, 2006, to Veit et al. for a POSITIVE DISPLACEMENT SHOE AND SLAT SORTER APPARATUS AND METHOD, U.S. Pat. No. 8,713,899, issued May 6, 2014, to Hortig, et al. for a GOODS-TO-PERSON PICKING STATION AND PICKING METHOD, U.S. Pat. No. 8,974,168, issued Mar. 10, 2015 to Yamashita for a MULTI-TIER AUTOMATED WAREHOUSE, U.S. Pat. No. 9,266,675, issued Feb. 23, 2016 to Yamashita for an AUTOMATED THREE DIMENSIONAL WAREHOUSE, U.S. Pat. No. 9,452,886, issued Sep. 27, 2016 to Yamashita for a METHOD FOR PROVIDING TRANSPORT UNITS FROM A STORAGE FACILITY, U.S. Pat. No. 9,555,967, issued Jan. 31, 2017 to Stevens for a LIFT CONFIGURATION FOR CARRIAGE-BASED WAREHOUSE, U.S. Pat. No. 9,580,248, issued Feb. 28, 2017, to Hasman et al. for a ONE-TO MANY PUT SEQUENCE OPTIMIZATION, U.S. Pat. No. 9,604,781, issued Mar. 28, 2017, to Stevens, et al. for a PICKING STATION WITH AUTOMATIC WAREHOUSE, U.S. Pat. No. 9,630,777, issued Apr. 25, 2017, to Yamashita for a MULTI-TIER AUTOMATED WAREHOUSE, U.S. Pat. No. 10,062,046, issued Aug. 28, 2018, to Ogden for a DYNAMIC RATE MATCHING FOR MATE- RIAL HANDLING, U.S. Pat. No. 10,301,113, issued May 28, 2019 to Stevens et al. for a PICKING STATION WITH AUTOMATED WAREHOUSE, are hereby incorporated herein by reference in their entireties.

Thus, the order-fulfillment and decant sequencing system 10 and methods 100, 200, 300, 400, 500, 600 are provided for sequencing and optimizing the subsystems of an order fulfilment or warehouse facility 12 to increase efficiency of the facility hardware and labor force and thereby increase throughput. The system and methods control the flow and sequencing of inbound items as they are delivered to the facility and as the inbound items are decanted for storage. The system and methods control the flow and sequencing of order fulfillment containers and storage containers for order fulfilment processes. The methods utilize an electronic management system to interconnect and synchronize the entire facility and its subsystems and labor force. The methods can be adapted to optimize the sequencing and control of shipping/receiving yards, internal receiving, inventory, order fulfillment, slotting based on order historical data, and internal shipping, in addition to other contemplated functions and processes. The methods and system can be scaled to suit existing building dimensions and/or facility throughput requirements. The methods and system can be adapted for various fulfilment facilities, including warehouses, e-commerce order fulfilment facilities, micro-fulfilment facilities (e.g. grocery markets, retail), and click-and-collect facilities (e.g. online order with direct customer pickup). Multiple sequencing systems 10 may deployed within the facility and be controlled by the same electronic management system.

Changes and modifications in the specifically described embodiments can be carried out without departing from the principles of the present invention which is intended to be limited only by the scope of the appended claims, as interpreted according to the principles of patent law including the doctrine of equivalents.

The invention claimed is:

1. A method for balancing resources within an automated warehouse facility and assigning work processes to workstations within the facility, said method comprising:
   calculating, with a warehouse management system, a production rate for each pending order selected from a database of pending orders;
   categorizing each of the pending orders into a plurality of sub-lists based on the shipment configuration required for each order;
   for each highest priority order per sub-list, assigning each of the selected orders to one of a plurality of sequencing systems within the facility, wherein each sequencing system comprises a sequencing tower and a plurality of order fulfilment and decant workstations, the sequencing tower and workstations in transport communication with particular aisles of an automated storage and retrieval system that is configured to store and retrieve items within the facility, said assigning each of the selected orders to a sequencing system is performed based on the most efficient resource allocation determined based on the relative positioning between resources of the sequencing system and the position of required items stored in the automated storage and retrieval system;
   for each sequencing system within the facility, assigning each order that is assigned to the respective sequencing system to one of the plurality of order fulfillment and decant workstations within the sequencing system, wherein each order fulfillment and decant workstation is adaptable for performing either chosen from order fulfilment operations and decant operations, said assigning each of the selected orders to a workstation is performed based on the most efficient resource allocation determined based on the relative positioning between workstations of the sequencing system and the position of required items stored in the automated storage retrieval system;
   buffering the required shipping containers for each of the orders that are assigned to the respective sequencing towers; and
   wherein when the required shipping container and all required items for a selected order are available at the respective sequencing tower and the automated storage and retrieval system, releasing all of the required items such that the items arrive simultaneously at the selected workstation.

2. The method of claim 1, wherein the sub-lists of orders comprise one chosen from a multi-unit order, a single unit order requiring a shipping carton, and a single unit order requiring a shipping bag.

3. The method of claim 1, further comprising assigning inbound containers to a preferred one of the plurality of workstations within a sequencing system, said assigning inbound containers is performed based on the most efficient resource allocation determined based on the capacity of the selected workstation and the preferred storage position within the automated storage and retrieval system for the items in the inbound container based on future order fulfilment requirements for those items.

4. The method of claim 1 further comprising:
   determining, with the warehouse management system, if items required for a selected pending order are available in the automated storage and retrieval system;
   wherein if the items are available in the automated storage and retrieval system, assigning the selected pending order to a selected sequencing system of the plurality of sequencing systems that is in transport communication with the automated storage and retrieval system;
   determining, with the warehouse management system, if a shipping container required for the selected pending order is available in a sequencing buffer of the selected sequencing system;
   wherein if the shipping container is not available in the sequencing buffer, selecting a different pending order to process;
   wherein if the shipping container is available in the sequencing buffer, assigning the selected pending order to one of the plurality of order fulfillment and decant workstations of the selected sequencing system that is in communication with the selected sequencing buffer; and
   releasing the shipping container from the sequencing buffer to the assigned order fulfillment and decant workstation and releasing the items from the automated storage and retrieval system to the assigned order fulfillment and decant workstation such that the shipping container and the items arrive at the assigned order fulfillment and decant workstation simultaneously.

5. The method of claim 1, wherein said buffering the required shipping containers for each of the orders that are assigned to the respective sequencing towers comprises storing the required shipping containers in respective sequencing buffers, wherein each of the sequencing buffers comprises a respective sequencing tower.

6. The method of claim 5, wherein each of said sequencing towers comprises a lift system, a plurality of storage locations, and a plurality of buffer conveyors for transporting items into and out of said sequencing tower.

7. The method of claim 5, wherein said required shipping containers are stored in respective sequencing buffers until the warehouse management system releases the respective required shipping containers.

8. The method of claim 3 further comprising:
- assigning, with the warehouse management system, an inbound container to one of the plurality of sequencing systems;
- buffering the inbound container in a sequencing buffer of a selected sequencing system of the plurality of sequencing systems;
- releasing an inventory container from the automated storage and retrieval system to be delivered to a selected one of the plurality of order fulfillment and decant workstations;
- releasing the inbound container from the sequencing buffer of the selected sequencing system to the selected order fulfillment and decant workstation; and
- wherein said releasing the inventory container and said releasing the inbound container are performed such that the inventory container and the inbound container arrive at the selected order fulfillment and decant workstation simultaneously.

9. The method of claim 8 further comprising decanting, at the selected order fulfillment and decant workstation, inventory items from the inbound container to the inventory container.

10. The method of claim 9 further comprising returning the inventory container back to the automated storage and retrieval system.

* * * * *